(12) United States Patent
Koyama

(10) Patent No.: US 7,844,302 B2
(45) Date of Patent: Nov. 30, 2010

(54) COMMUNICATION TERMINAL, RECEPTION NOTIFYING METHOD, AND COMPUTER-READABLE RECORDING MEDIUM

(75) Inventor: Hirohisa Koyama, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 0 days.

(21) Appl. No.: 11/580,747

(22) Filed: Oct. 12, 2006

(65) Prior Publication Data
US 2007/0086064 A1 Apr. 19, 2007

(30) Foreign Application Priority Data

Oct. 13, 2005 (JP) ............................. 2005-299358
Sep. 26, 2006 (JP) ............................. 2006-261015

(51) Int. Cl.
| | |
|---|---|
| H04M 1/00 | (2006.01) |
| H04M 1/725 | (2006.01) |
| H04M 1/663 | (2006.01) |
| H04M 3/42 | (2006.01) |
| H04B 1/38 | (2006.01) |
| H04B 1/18 | (2006.01) |
| H04N 1/00 | (2006.01) |
| G06F 15/16 | (2006.01) |

(52) U.S. Cl. .................... 455/566; 455/567; 455/575.1; 455/412.2; 455/415; 455/158.4; 455/575.3; 455/575.4; 358/402; 709/206

(58) Field of Classification Search ................. 358/402; 709/206; 455/158.4, 412.2, 415, 566, 567, 455/575.1, 575, 3, 575.4
See application file for complete search history.

(56) References Cited

U.S. PATENT DOCUMENTS

| | | | | |
|---|---|---|---|---|
| 6,223,047 | B1 * | 4/2001 | Ericsson | 455/517 |
| 6,529,747 | B1 * | 3/2003 | Toba | 455/563 |
| 6,807,433 | B2 * | 10/2004 | Oota et al. | 455/566 |
| 6,928,300 | B1 * | 8/2005 | Skinner et al. | 455/556.2 |
| 7,074,045 | B2 * | 7/2006 | Kawahigashi et al. | 439/38 |
| 2004/0091090 | A1 * | 5/2004 | Hong et al. | 379/102.03 |

(Continued)

FOREIGN PATENT DOCUMENTS

JP 06-120978 4/1994

(Continued)

Primary Examiner—Mark K Zimmerman
Assistant Examiner—Fan Zhang
(74) Attorney, Agent, or Firm—Cohen Pontani Lieberman & Pavane LLP

(57) ABSTRACT

A mobile communication terminal obtains analysis result from analysis of various information included in a received e-mail. The mobile communication terminal determines whether the received e-mail satisfies a notification condition based on the analysis result, and analyzes the importance degree of the received e-mail. If the received e-mail is an important e-mail satisfying the notification condition, the mobile communication terminal notifies the user that the e-mail is received irrespective of whether its cover is opened or closed. If the received e-mail is a non-important e-mail not satisfying the notification condition, the mobile communication terminal limits notifying the user that the e-mail is received until the cover is opened, i.e., the content of the e-mail is checkable by the user. This makes it possible to restrict notifying the reception of the e-mail depending on the e-mail's importance degree, while preventing the user from missing any e-mail of high importance.

19 Claims, 14 Drawing Sheets

U.S. PATENT DOCUMENTS

| | | | |
|---|---|---|---|
| 2004/0096046 A1* | 5/2004 | Lection et al. | 379/142.06 |
| 2005/0044500 A1* | 2/2005 | Orimoto et al. | 715/706 |
| 2005/0091674 A1* | 4/2005 | Knight et al. | 719/332 |
| 2005/0128974 A1 | 6/2005 | Yamada et al. | |
| 2006/0104423 A1* | 5/2006 | Heidloff et al. | 379/88.12 |
| 2006/0135226 A1* | 6/2006 | Won et al. | 455/575.3 |
| 2006/0206569 A1* | 9/2006 | Heidloff et al. | 709/206 |

FOREIGN PATENT DOCUMENTS

| | | |
|---|---|---|
| JP | 2000-047954 | 2/2000 |
| JP | 2002-297507 | 10/2002 |
| JP | 2002-354542 | 12/2002 |
| JP | 2004-086500 | 3/2004 |
| JP | 2004-234336 | 8/2004 |
| JP | 2005-027198 | 1/2005 |
| JP | 2005-175832 | 6/2005 |
| JP | 2005192225 A * | 7/2005 |
| JP | 2005-216197 | 8/2005 |

* cited by examiner

| RECEPTION NUMBER | DESTINATION ADDRESS | CC | SENDER | SUBJECT | E-MAIL BODY | RECEPTION DATE | NON-IMPORTANCE DEGREE FLAG | ... |
|---|---|---|---|---|---|---|---|---|
| ... | ... | ... | ... | ... | ... | ... | ... | ... |
| 0007 | suzuki@ ○○○.co.jp | tanaka@ △△△.co.jp | satoh@ □□□.co.jp | Thank you | Dear Mr. Suzuki, ... | 200X.1.23 | 1 | ... |
| ... | ... | ... | ... | ... | ... | ... | ... | ... |

FIG. 3

| NOTIFICATION CONDITION | NOTIFICATION MANNER | | |
|---|---|---|---|
| | DISPLAY OF NUMBER OF NEWLY RECEIVED E-MAILS | VIBRATION | DISPLAY OF PICTOGRAM |
| 1. USER IS INCLUDED AS DESTINATION | TO BE DISPLAYED | TO BE VIBRATED (LONG VIBRATION) "VRRRRR, VRRRRR" | TO BE DISPLAYED |
| 2. USER IS INCLUDED AS CC | TO BE DISPLAYED | TO BE VIBRATED (SHORT VIBRATION) "VRR, VRR, VRR" | TO BE DISPLAYED |
| 3. DESIGNATED SUBJECT IS INCLUDED IN SUBJECT | TO BE DISPLAYED | NOT TO BE VIBRATED | NOT TO BE DISPLAYED |
| 4. USER'S NAME IS INCLUDED IN FIRST LINE OF E-MAIL BODY | TO BE DISPLAYED | NOT TO BE VIBRATED | NOT TO BE DISPLAYED |

FIG. 6

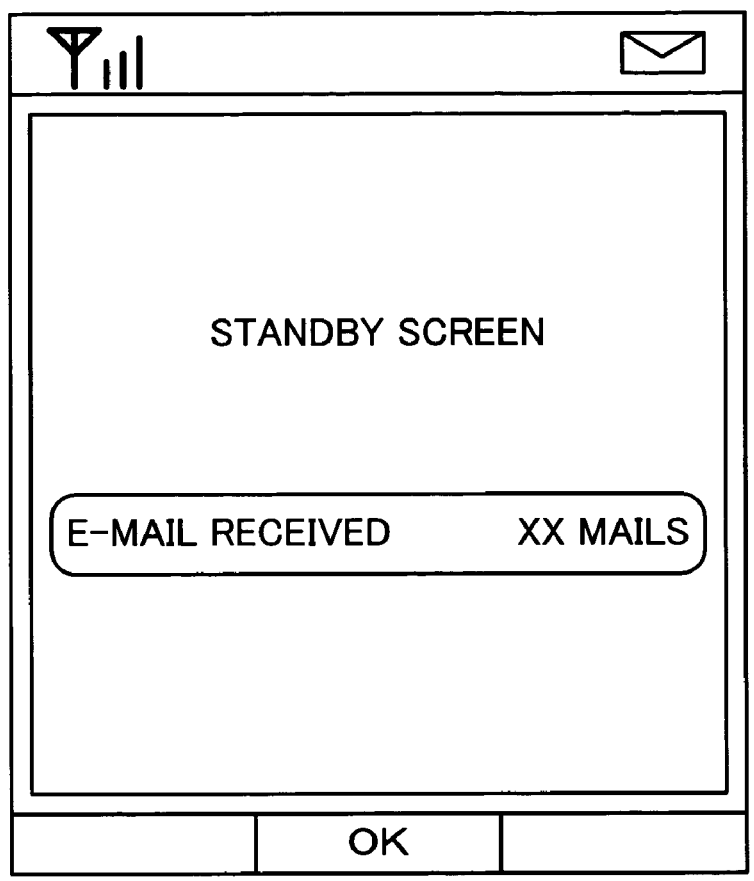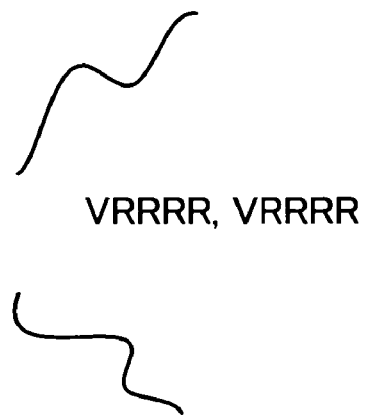
FIG. 11

DELETION CANDIDATES

| SENDER | SUBJECT | RECEPTION DATE | DELETE |
|---|---|---|---|
| ···.co.jp | AAA | 200X.1.23 | ☑ |
| ···.co.jp | BBB | 200X.1.23 | ☑ |
| ···.co.jp | CCC | 200X.1.22 | ☑ |
| ···.co.jp | DDD | 200X.1.22 | ☑ |

ARE YOU OK IF CHECKED E-MAILS ARE DELETED SIMULTANEOUSLY?

COMMUNICATION TERMINAL, RECEPTION NOTIFYING METHOD, AND COMPUTER-READABLE RECORDING MEDIUM

BACKGROUND OF THE INVENTION

1. Field of the Invention

The present invention relates to a communication terminal such as an e-mail terminal, etc., a reception notifying method for e-mail reception, and a computer-readable recording medium storing a program for executing the reception notifying method.

2. Description of the Related Art

Recently, the widest-spreading mobile communication terminals such as portable phones have not only a call function but also an e-mail sending and receiving function using the Internet.

When an e-mail is received, such a mobile communication terminal notifies the user of the reception of the e-mail, for example, by outputting a ring alert from its speaker or by vibrating itself using the vibrator function. This notification is normally given in the same way irrespective of how the received e-mails are important or urgent.

Therefore, each time the user is notified of reception of an e-mail, he/she has to check the sender, the subject, and in some case, the e-mail body of the newly received e-mail, by opening the folder in which the received e-mail is stored, in order not to miss any e-mails that are highly important or urgent.

An information processing apparatus disclosed in, for example, Unexamined Japanese Patent Application KOKAI Publication No. 2002-297507 is one solution to this problem. This information processing apparatus notifies the user of reception of an e-mail, by reproducing the audio of the reception notifying message by changing the sound quality, the sound volume, the reproducing speed, etc. depending on the header information of the received e-mail. The user is therefore enabled to determine the degree of importance or urgency of the e-mail without checking the sender and the subject of the e-mail.

However, the apparatus disclosed in Unexamined Japanese Patent Application KOKAI Publication No. 2002-297507 notifies the user of reception of an e-mail each time it receives an e-mail, though it changes the manner of outputting the reception notifying message e-mail by e-mail. This might bother the user when the user has many works to do. However, if the user sets a silent mode to have no notifications given so as not to be bothered, this in turn puts the user at a risk of missing any e-mails that are important or urgent.

SUMMARY OF THE INVENTION

The present invention was made to solve the above-described problem, and an object of the present invention is to provide a communication terminal, a reception notifying method, and a computer-readable recording medium which can limit notifying reception of an e-mail, depending on the degree of importance of the received e-mail.

To achieve the above object, a communication terminal according to a first aspect of the present invention comprises:

an e-mail receiving unit which receives an e-mail;

an importance degree determining unit which determines whether or not the e-mail received by the e-mail receiving unit is an important e-mail having a high degree of importance; and a reception notifying unit which notifies a user that the e-mail is received, on a condition that there arises a state in which a content of the e-mail is viewable in a case where the importance degree determining unit determines that the e-mail is not an important e-mail, and notifies the user that the e-mail is received, irrespective of whether or not there arises the state in which the content of the e-mail is viewable in a case where the importance degree determining unit determines that the e-mail is an important e-mail.

A communication terminal according to a second aspect of the present invention is a communication terminal which has its first housing and second housing jointed by a hinge so as to be foldable, and comprises:

an open/closed state detecting unit which detects an open state of the first housing in which the communication terminal is not folded, and a closed state of the first housing in which the communication terminal is folded;

an e-mail receiving unit which receives an e-mail;

an importance degree determining unit which determines whether or not the e-mail received by the e-mail receiving unit is an important e-mail having a high degree of importance; and a reception notifying unit which notifies a user that the e-mail is received when a state of the first housing detected by the open/closed state detecting unit is the open state in a case where the importance degree determining unit determines that the e-mail is not an important e-mail, and notifies the user that the e-mail is received irrespective of whether the state of the first housing is the open state or the closed state in a case where the importance degree determining unit determines that the e-mail is an important e-mail.

A reception notifying method according to a third aspect of the present invention comprises:

an e-mail receiving step of receiving an e-mail;

an importance degree determining step of determining whether or not the e-mail received at the e-mail receiving step is an important e-mail having a high degree of importance; and a reception notifying step of notifying a user that the e-mail is received, on a condition that there arises a state in which a content of the e-mail is viewable, in a case where it is determined at the importance degree determining step that the e-mail is not an important e-mail, and notifying the user that the e-mail is received, irrespective of whether or not there arises the state in which the content of the e-mail is viewable, in a case where it is determined at the importance degree determining step that the e-mail is an important e-mail.

A computer-readable recording medium according to a fourth aspect of the present invention stores a program for controlling a computer to execute:

an e-mail receiving step of receiving an e-mail;

an importance degree determining step of determining whether or not the e-mail received in the e-mail receiving step is an important e-mail having a high degree of importance; and a reception notifying step of notifying a user that the e-mail is received, on a condition that there arises a state in which a content of the e-mail is viewable, in a case where it is determined in the importance degree determining step that the e-mail is not an important e-mail, and notifying the user that the e-mail is received, irrespective of whether or not there arises the state in which the content of the e-mail is viewable, in a case where it is determined in the importance degree determining step that the e-mail is an important e-mail.

A communication terminal according to a fifth aspect of the present invention comprises:

a receiving unit which receives an e-mail;

an e-mail determining unit which determines whether or not the e-mail received by the receiving unit is an important e-mail;

a first notifying unit which notifies reception of the e-mail, when the e-mail determining unit determines that the e-mail is an important e-mail;

an operation unit which receives an input of information from a user;

a state determining unit which determines whether or not the operation unit is in an effective state in which the user can input information, when the e-mail determining unit determines that the e-mail is not an important e-mail; and a second notifying unit which notifies reception of the e-mail which the e-mail determining unit determines not to be important, when the state determining unit determines that the operation unit is in the effective state.

A computer-readable recording medium according to a sixth aspect of the present invention stores a program for controlling a computer to execute:

a receiving step of receiving an e-mail;

an e-mail determining step of determining whether or not the e-mail received in the receiving step is an important e-mail;

a first notifying step of notifying reception of the e-mail, when it is determined in the e-mail determining step that the e-mail is an important e-mail;

a state determining step of determining whether or not an operation unit for receiving an input of information from a user is in an effective state in which the user can input information, when it is determined in the e-mail determining step that the e-mail is not an important e-mail; and a second notifying step of notifying reception of the e-mail which is determined in the e-mail determining step not to be important, when it is determined in the state determining step that the operation unit is in the effective state.

According to the present invention, it is possible to limit notifying reception of an e-mail, depending on the degree of importance of the received e-mail.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of the data structure of an incoming e-mail stored in an incoming e-mail storage unit;

FIG. 6 is a diagram showing an example of the structure of a notification manner determination table;

FIG. 11 is a diagram showing an example of image display on the display section, according to a notification manner;

FIG. 13 is a diagram showing an example of image display of a deletion candidate list screen on the display section.

DETAILED DESCRIPTION OF THE PREFERRED EMBODIMENTS

The embodiments of the present invention will be specifically explained below.

First Embodiment

A mobile communication terminal as one example of a communication terminal will be explained in the following description. The mobile communication terminal according to the first embodiment of the present invention is a terminal apparatus for mobile communication such as portable phones, PHSs (Personal Handyphone Systems), etc. The present mobile communication terminal has a function (wireless call function) for communicating with other mobile communication terminals by wireless calling via a base station, a function (web page browsing function) for browsing web pages on the Internet, a function (e-mail sending and receiving function) for sending or receiving e-mails via the Internet.

First, the specific structure of the mobile communication terminal according to the present embodiment will be explained.

Figure 1A:
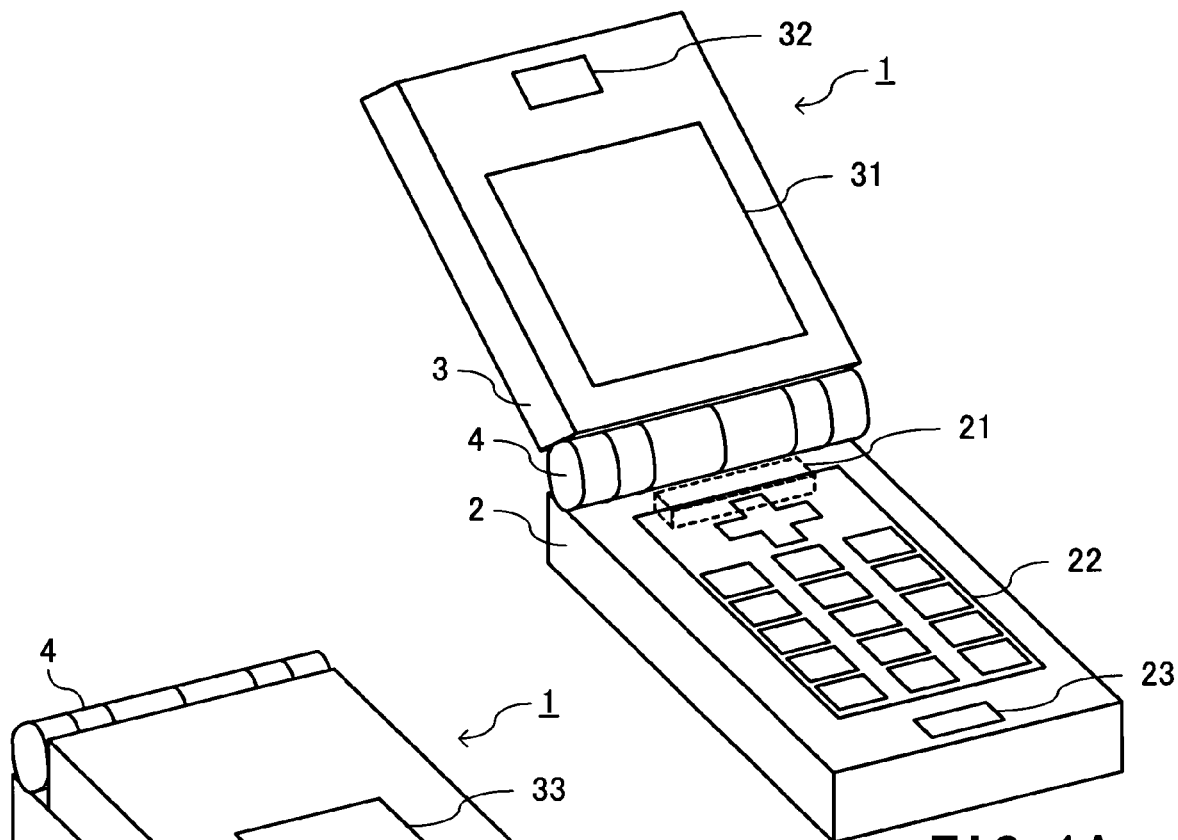
FIG. 1A to FIG. 1C are exemplary diagrams showing an example of appearance of a mobile communication terminal according to a first embodiment of the present invention.
Figure 1B:
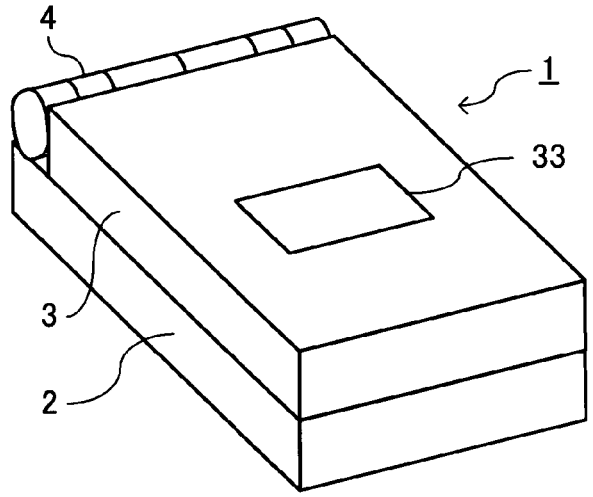
Figure 1C:
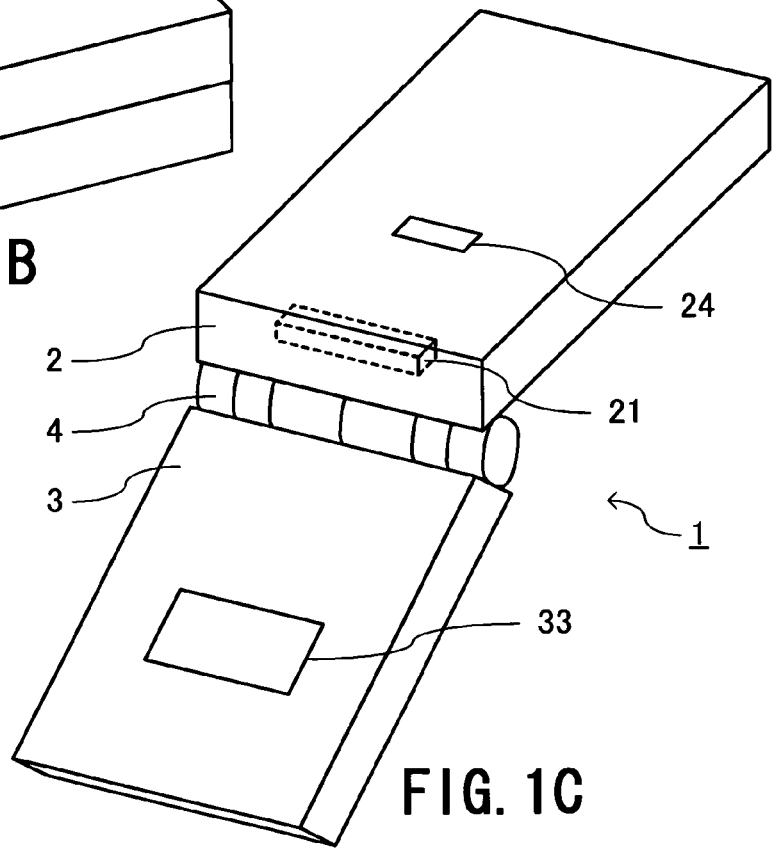

FIG. 1A to FIG. 1C are exemplary diagrams showing the example of appearance of the mobile communication terminal 1 according to the first embodiment of the present invention.

The mobile communication terminal 1 comprises a body portion 2, a cover portion 3, and a hinge portion 4 as shown in FIG. 1A. The user can fold the mobile communication terminal 1 as shown in FIG. 1B, by rotating the cover portion 3 about the hinge portion 4 as the rotation shaft, toward the body portion 2.

The body portion 2 is a housing, and comprises an antenna 21, an operation section 22, a microphone 23, and a notifying speaker 24 as shown in FIG. 1A and FIG. 1C. The cover portion 3 is a housing, and comprises a display section (main display section) 31, a calling speaker 32, and a sub display section 33 as shown in FIG. 1A to FIG. 1C.

The antenna 21 of the body portion 2 exchanges radio signals with a base station (unillustrated). For example, the antenna 21 exchanges radio signals carrying call data when a phone call is made, and exchanges radio signals carrying e-mail data when e-mails are sent or received. The antenna 21 receives radio signals carrying web page data when web pages are browsed. The antenna 21 is encapsulated in the body portion 2.

The operation section 22 comprises an input device such as a cross-shaped cursor key, alphanumerical keys for typing numerals and characters, buttons for designating functions, etc. The user inputs various information to the mobile communication terminal 1 by operating the operation section 22. For example, the user can generate an e-mail document, etc. by inputting characters by operating the operation section 22. The user makes a call, answers a call, browses web pages, and checks (views) the content of a received e-mail by operating the operation section 22.

The microphone 23 picks up the voice of the user when the user is making a call.

The notifying speaker 24 outputs a ring alert for notifying the user of reception of a wireless call or an e-mail, when a wireless call or an e-mail is received. The notifying speaker 24 is provided on one surface of the body portion 2 that is opposite to the surface on which the operation section 22 is provided as shown in FIG. 1C.

The display section (main display section) 31 of the cover portion 3 comprises a display device such as, for example, a liquid crystal display (LCD). The display section 31 displays various information. For example, the display section 31 displays an image or the like for effecting various operations of the mobile communication terminal 1. Further, when the user generates an e-mail and checks the content of an e-mail, the content of the e-mail is displayed on the display section 31. When the user browses web ages, the web pages are displayed on the display section 31.

The calling speaker 32 outputs the received voice of the calling partner, when a hone call is made.

The sub display section 33 comprises a display device such as, for example, a liquid crystal display (LCD). The sub display section 33 displays various information likewise the display section (main display section) 31.

FIG. 1A and FIG. 1C show an open state where the cover portion 3 is opened up from the body portion 2. The user uses the mobile communication terminal 1 while in this open state in which information can be input from the operation section 22, when the user checks the content of an e-mail.

FIG. 1B shows a closed state where the cover portion 3 is closed on the body portion 2. The user folds the mobile communication terminal 1 to bring it into the closed state when he/she does not use the mobile communication terminal 1. In the closed state, the user cannot input information from the operation section 22. Further, in the closed state, the information to be displayed is displayed on the sub display section 33, not on the display section (main display section) 31. The mobile communication terminal 1 receives a call or an e-mail even in the closed state. In a case where a call or an e-mail is received in the closed state, the user brings the mobile communication terminal 1 into the open state in which operation of the operation section 22 is effective, and takes the telephone call or checks the e-mail by operating the operation section 22.

Figure 2:
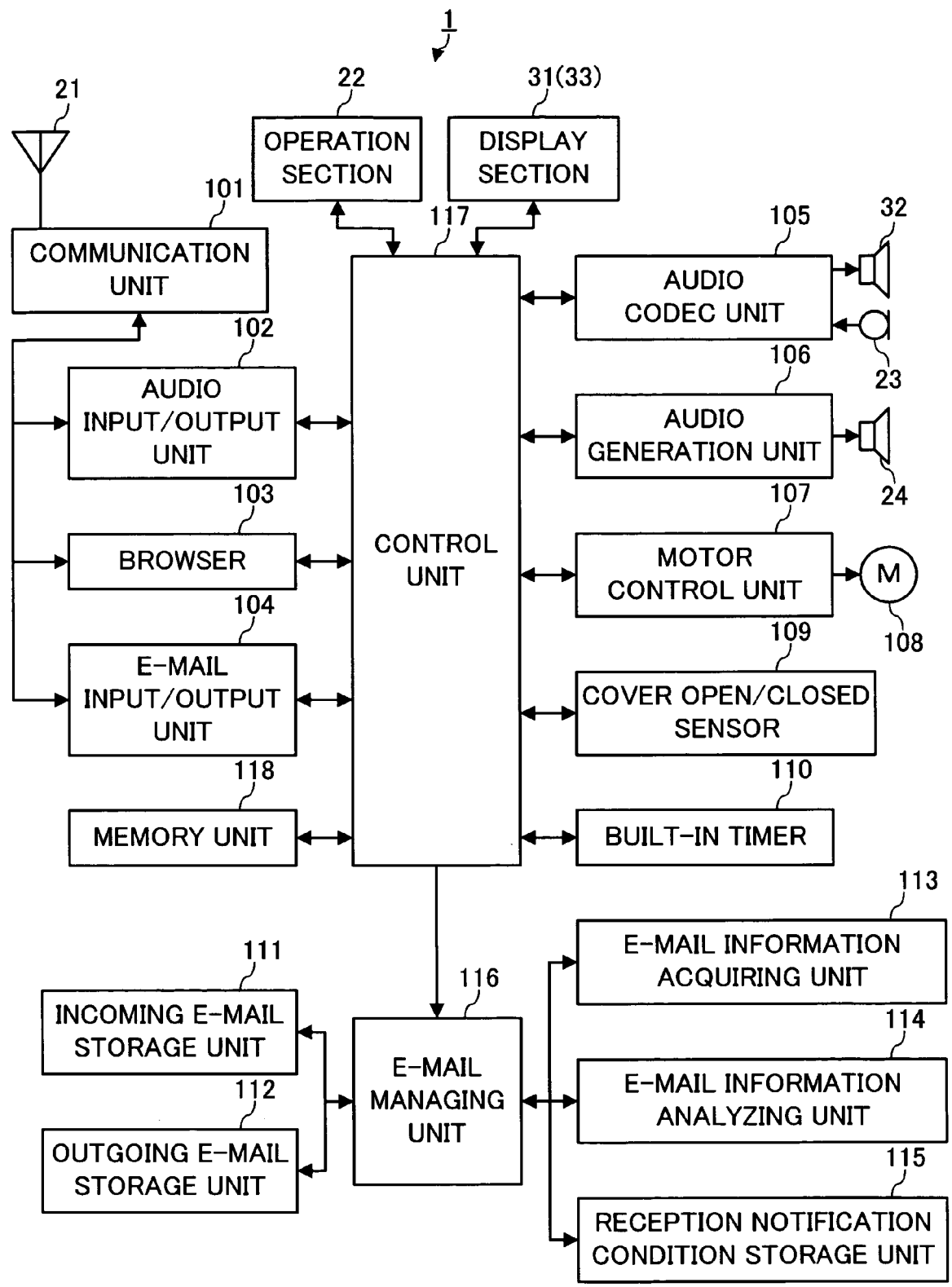
FIG. 2 is a block diagram showing an example of the configuration of the mobile communication terminal according to the first embodiment of the present invention.

FIG. 2 is a block diagram showing an example of the configuration of the mobile communication terminal 1 according to the present embodiment. In FIG. 2, those components that are the same as those shown in FIG. 1 will be denoted by the same reference numerals, and explanation for such components will be omitted.

As shown in FIG. 2, the mobile communication terminal 1 comprises the antenna 21, a communication unit 101, an audio input/output unit 102, a browser 103, an e-mail input/output unit 104, the operation section 22, the display section 31 (or the sub display section 33), an audio CODEC (Coder Decoder) unit 105, the calling speaker 32, the microphone 23, an audio generation unit 106, the notifying speaker 24, a motor control unit 107, a vibration motor 108, a cover open/closed sensor 109, a built-in timer 110, an incoming e-mail storage unit 111, an outgoing e-mail storage unit 112, an e-mail information acquiring unit 113, an e-mail information analyzing unit 114, a reception notification condition storage unit 115, an e-mail managing unit 116, a control unit 117, and a memory unit 118.

The communication unit 101 is supplied with a radio signal which the antenna 21 receives from a base station. The communication unit 101 applies demodulation, A/D (Analog-Digital) conversion, back diffusion, phase correction, etc. to the signal input from the antenna 21, thereby receiving the data sent from the base station. Then, the communication unit 101 supplies the received data to the audio input/output unit 102 when the received data is call data, supplies the received data to the browser 103 when the received data is content data representing web pages, and supplies the received data to the e-mail input/output unit 104 when the received data is an e-mail.

The communication unit 101 applies error correction, diffusion, D/A (Digital-Analog) conversion, modulation, etc. to call data supplied from the audio input/output unit 102 or to an e-mail supplied from the e-mail input/output unit 104. Then, the communication unit 101 radiates the signal, to which these processes have been applied, to the air through the antenna 21, thereby sending the call data or the e-mail to a base station.

The audio input/output unit 102 supplies call data received by the communication unit 101 to the audio CODEC unit 105. The audio input/output unit 102 supplies call data generated by the audio CODEC unit 105 to the communication unit 101.

The browser 103 is software executed by a CPU of the control unit 117, and enables the user to browse the web pages designated by the user. The browser 103 of the present embodiment is a web browser (full browser) used on a general-purpose computer, and acquires the content data of web pages designated by the user through the Internet and a base station, and displays the data on the display section 31. Thereby, the user can browse the web pages by using the mobile communication terminal 1.

The e-mail input/output unit 104 supplies an e-mail received by the communication unit 101 to the e-mail managing unit 116. The e-mail input/output unit 104 supplies an e-mail generated by the control unit 117 in accordance with the input by the user from the operation section 22 to the communication unit 101.

The audio CODEC unit 105 applies decoding and D/A conversion to call data supplied from the audio input/output unit 102. Then, the audio CODEC unit 105 supplies the call data, to which these processes have been applied, to the calling speaker 32. Thereby, the voice of the calling partner is output from the calling speaker 32.

The audio CODEC unit 105 generates call data by applying A/D conversion and coding to the voice of the user input to the microphone 23. Then, the audio CODEC unit 105 supplies the generated call data to the audio input/output unit 102.

The audio generation unit 106 outputs a notifying sound such as a ring alert, etc. from the notifying speaker 24, in accordance with an instruction from the control unit 117. Specifically, when call data or an e-mail is received by the communication unit 101, the audio generation unit 106 applies decoding and D/A conversion to music data supplied from the control unit 117. Then, the audio generation unit 106 supplies the music data, to which these processes have been applied, to the notifying speaker 24 to output the ring alert from the notifying speaker 24.

The motor control unit 107 drives the rotation shaft of the vibration motor 108 to rotate, in accordance with an instruction from the control unit 117. The rotation shaft of he vibration motor 108 is equipped with a weight at a position off the center of gravity hereof. When the motor control unit 107 drives the rotation shaft to rotate, the weight swings and the mobile communication terminal 1 vibrates. Thereby, a so-called vibrator function, which is a function for notifying the user that the user has received a call or an e-mail, can be realized.

The cover open/closed sensor 109 is provided inside the hinge portion 4. The cover open/closed sensor 109 detects whether the cover portion 3 is opened from or closed upon the body portion 2, based on the angle of rotation of the cover portion 3 with respect to the body portion 2, and outputs the detection signal to the control unit 117. Specifically, the cover open/closed sensor 109 sets the detection signal to an off state in case of the open state where the cover portion 3 is opened from the body portion 2, and sets the detection signal to an on state in case of the closed state where the cover portion 3 is closed upon the body portion 2. The cover open/closed sensor 109 may be provided on the body portion 2 or the cover portion 3 in the neighborhood of the junction between the body portion 2 and the cover portion 3, so that it may detect the open state or the closed state based on the relative positional relationship between the body portion 2 and the cover portion 3.

The built-in timer 110 measures an elapsing time in accordance with an instruction from the control unit 117, and outputs a timer value based on the time that has elapsed, to the control unit 117.

The incoming e-mail storage unit 111 and the outgoing e-mail storage unit 112 are constituted by, for example, a flash memory or the like. The incoming e-mail storage unit 111 and the outgoing e-mail storage unit 112 may be constituted by different flash memories, or may be secured in a single flash memory.

The incoming e-mail storage unit 111 stores an e-mail (incoming e-mail) received by the communication unit 101 in association with a non-importance degree flag. The non-importance degree flag has an initial value "0" (BIN), and is updated to "1" in a case where the degree of importance (or degree of urgency) of an incoming e-mail is determined as low. In a case where the degree of importance (or degree of urgency) of an incoming e-mail is determined as high, the value of the non-importance degree flag remains "0". How to determine the degree of importance of an incoming e-mail will be described later.

FIG. 3 is a diagram showing an example of the data structure of an incoming e-mail stored in the incoming e-mail storage unit 111.

As shown in FIG. 3, the incoming e-mail storage unit 111 stores an incoming e-mail by diving the data into reception number, destination address (To), CC (Carbon Copy), sender (From), subject, e-mail body, reception date, non-importance degree flag, etc.

The reception number is information for identifying the incoming e-mail assigned to each incoming e-mail. The reception number is assigned when an incoming e-mail is stored in the incoming e-mail storage unit 111, and recorded in the field of reception number.

In the fields of destination address, CC, sender, and subject, the e-mail address of the destination, the e-mail address of the receiver of carbon-copied data, the e-mail address of the e-mail sender, and the characters representing the subject are recorded respectively.

In the field of e-mail body, the text of the body of the incoming e-mail is recorded. The text of the body of the incoming e-mail may be stored in a predetermined area of a memory, and the address of the area in which the e-mail body is stored may be recorded in the field of e-mail body.

The date on which the incoming e-mail is received is recorded in the field of reception date.

The value of the non-importance degree flag indicating whether the degree of importance of the incoming e-mail is high or low is recorded in the field of non-importance degree flag. The value "0" is recorded in the field of non-importance degree flag, as the initial value.

Returning to FIG. 2, the outgoing e-mail storage unit 112 stores an e-mail (outgoing e-mail) to be sent from the communication unit 101 via a base station.

The e-mail information acquiring unit 113 acquires each kind of information such as the destination address, CC, subject, e-mail body, etc. of an incoming e-mail, from the incoming e-mail storage unit 111, in cooperation with the e-mail managing unit 116.

The e-mail information analyzing unit 114 analyzes each kind of information acquired by the e-mail information acquiring unit 113 and obtains an analysis result, in cooperation with the e-mail managing unit 116. Specifically, the e-mail information analyzing unit 114 analyzes an incoming e-mail to check whether or not the e-mail satisfies a predetermined condition, based on the information such as the destination address, CC, subject, e-mail body, etc. of the incoming e-mail acquired by the e-mail information acquiring unit 113, and outputs an analysis result to the e-mail managing unit 116. The detail of the analyzing method of the e-mail information analyzing unit 114 will be described later.

The reception notification condition storage unit 115 is constituted by, for example, a flash memory or the like, and stores a notification condition flag, a designated subject, and a notification manner determination table. The reception notification condition storage unit 115 may be constituted by a flash memory different from those constituting the incoming e-mail storage unit 111 and the outgoing e-mail storage unit 112, or may be provided in the same flash memory.

The notification condition flag is a flag that indicates a notification condition. A notification condition is a condition of an e-mail of which reception the user needs to be notified, and is set by the user.

Figure 4A:
FIG. 4A and FIG. 4B are diagrams showing examples of image display on a display section, for setting a notification condition.

The user sets the notification condition by using a notification condition setting screen shown in FIG. 4A, which is displayed on the display section 31. A list of notification conditions is displayed on the notification condition setting screen, and the user selects a notification condition which the user desires to be set, from the list. The mobile communication terminal 1 gives notification only when it receives an e-mail satisfying the notification condition selected by the user.

For example, if the user wants to be notified of reception of an e-mail which includes the e-mail address of the user as the destination address, he/she selects a notification condition 1 "1. the user is included as the destination" from the notification condition setting screen. In a case where the user wants to be notified of reception of an e-mail which includes the e-mail address of the user as CC, he/she selects a notification condition 2 "2. the user is included as CC" from the notification condition setting screen. In a case where the user wants to be notified of reception of an e-mail which includes a predetermined character string in the subject, he/she selects a notification condition 3 "3. the designated subject is included in the subject" from the notification condition setting screen. In a case where the user wants to be notified of reception of an e-mail which includes the user's name in the first line of the e-mail body, he/she selects a notification condition 4 "4. the user's name is included in the first line of the e-mail body" from the notification condition setting screen.

Figure 4B:

In a case where "3. the designated subject is included in the subject" is selected as the notification condition and "OK" in the lower portion of the notification condition setting screen is pointed, the notification condition setting screen changes to a designated subject input screen shown in FIG. 4B, which instructs the user to input a designated subject to be used as the notification condition. After the user inputs a certain character string from the designated subject input screen in accordance with this instruction, and points "OK" in the lower portion of the screen, the input character string is stored as the designated subject in the reception notification condition storage unit 115. A plurality of designated subjects may be set. In this case, reception of an e-mail which includes any of the plurality of set designated subjects is notified.

By the user setting the condition of e-mails which the user considers to be highly important, as the notification condition, the mobile communication terminal 1 gives reception notification only when it receives an e-mail having a high degree of importance.

The notification condition to be selected by the user may be other than those displayed on the notification condition setting screen shown in FIG. 4A. For example, in order that reception of an e-mail whose subject is the same as a designated subject will be notified, the notification condition 3 may be that "3. the subject is the same as the designated subject". Further, in order that reception of an e-mail which includes the user's name anywhere in the e-mail body will be notified, the notification condition 4 may be that "4. the user's name is included in the e-mail body".

Figure 5:
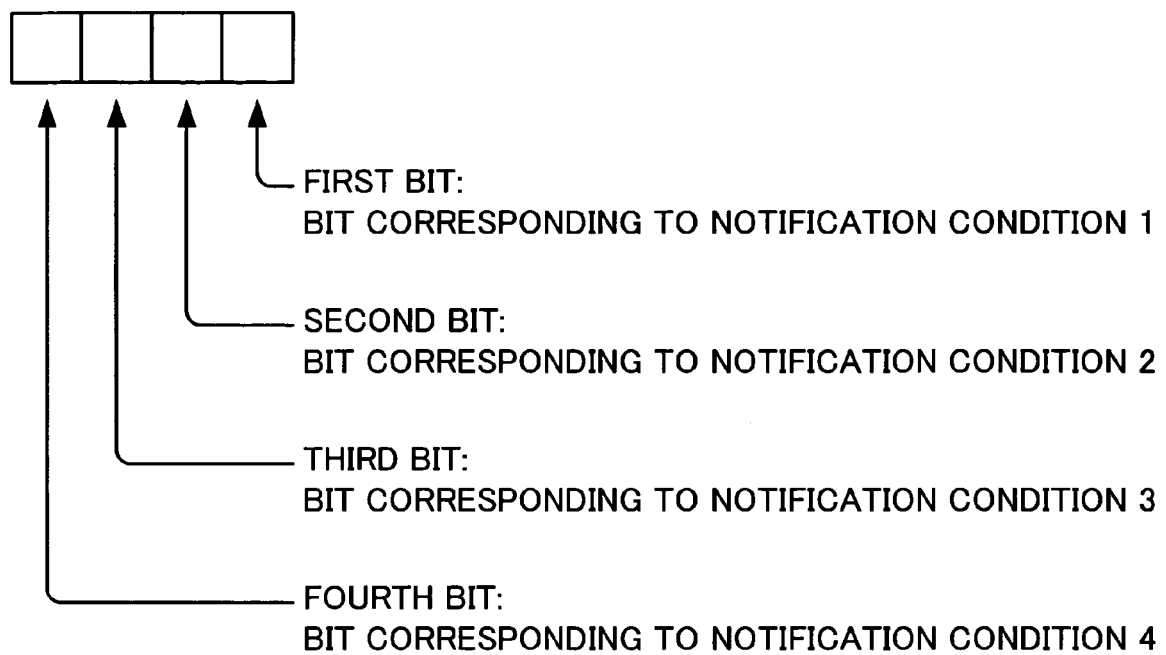
FIG. 5 is a diagram for explaining a notification condition flag.

The notification condition flag is a 4-bit flag as shown in FIG. 5, each of the first to fourth bit is associated with any of the four notification conditions displayed on the notification condition setting screen. The notification condition flag has its value updated in accordance with the notification condition selected by the user. Specifically, when a notification condition is selected, the value of the bit corresponding to the selected notification condition is set to 1. For example, in a case where "1. the user is included as the destination" is selected as the notification condition from the notification condition setting screen shown in FIG. 4A and "OK" in the lower portion of the screen is pointed, the value of the notification condition flag is updated to "0001" (BIN). In a case where "2. the user is included as CC" is selected as the notification condition and "OK" is pointed, the value of the notification condition flag is updated to "0010". In a case where "3. the designated subject is included in the subject" is selected as the notification condition and "OK" is pointed, the value of the notification condition flag is updated to "0100".

In a case where "4. the user's name is included in the first line of the e-mail body" is selected as the notification condition and "OK" is pointed, the value of the notification condition flag is updated to "1000". A plurality of notification conditions may be selected from the notification condition setting screen. For example, in a case where "1. the user is included as the destination", "3. the designated subject is included in the subject", and "4. the user's name is included in the first line of the e-mail body" are selected as notification conditions and "OK" is pointed, the value of the notification condition flag is updated to "1101".

The notification manner determination table is used in determining the manner (notification manner) of notifying the user that an e-mail is received, and stores the notification condition and the notification manner in association with each other. According to the present embodiment, as shown in FIG. 6, notification manners such as whether or not to display the number of newly received e-mails, whether or not to vibrate the mobile communication terminal 1 using the vibrator function and how to vibrate, whether or not to display a pictogram of an e-mail on the display section 31, etc. are registered in the notification manner determination table in association with the notification conditions such as the notification condition 1 "1. the user is included as the destination", the notification condition 2 "2. the user is included as CC", the notification condition 3 "3. the designated subject is included in the subject", and the notification condition 4 "4. the user's name is included in the first line of the e-mail body".

The notification manner that matches with the notification condition is determined based on the notification manner determination table. For example, in a case where the notification condition 1 is selected in the notification condition setting screen shown in FIG. 4A and the mobile communication terminal 1 receives an e-mail satisfying the notification condition 1, the number of newly received e-mails and the pictogram of the e-mail are displayed on the display section 31 and the mobile communication terminal 1 vibrates at long intervals within a period, to notify the user of the reception of the e-mail. The long vibration is available by rotating the rotation shaft of the vibration motor 108 at a low speed at long intervals. In a case where the notification condition 2 is selected and he mobile communication terminal 1 receives an e-mail satisfying the notification condition 2, the number of newly received e-mail and the pictogram of the e-mail are displayed on the display section 31 and the mobile communication terminal 1 vibrates at short intervals within a period, to notify the user of the reception of the e-mail. The short vibration is available by rotating the rotation shaft of the vibration motor 108 at a high speed at short intervals. Further, in a case where the notification condition 3 or 4 is selected and the mobile communication terminal 1 receives an e-mail satisfying the notification condition 3 or 4, the number of newly received e-mail is displayed on the display section 31 to notify the user of the reception of the e-mail. In the case where the notification condition 3 or 4 is selected, the pictogram of the e-mail is not displayed on the display section 31 and the mobile communication terminal 1 does not vibrate when the mobile communication terminal 1 receives an e-mail satisfying the notification condition 3 or 4.

In the closed state where the mobile communication terminal 1 is folded, the number of newly received e-mails and the pictogram of the e-mail are displayed on the sub display section 33 instead of the display section (main display section) 31.

Returning to FIG. 2, the e-mail managing unit 116 is constituted by, for example, a CPU (Central Processing Unit), a ROM (Read Only Memory), a RAM (Random Access Memory), etc. The e-mail managing unit 116 performs various managements relating to e-mails by the CPU appropriately executing various programs stored in the ROM while using the RAM as a work memory. For example, the e-mail managing unit 16 stores an incoming e-mail supplied from the control unit 117 in the incoming e-mail storage unit 111, and stores an outgoing e-mail in the outgoing e-mail storage unit 112.

An analysis result flag including four bits representing an analysis result achieved by the e-mail information analyzing unit 114 is set in the RAM of the e-mail managing unit 116. The analysis result flag will be described in detail later.

The control unit 117 is constituted by a CPU, a ROM, a RAM, etc. likewise the e-mail managing unit 116. The control unit 117 controls the operation of each element of the mobile communication terminal 1 by the CPU appropriately executing various programs stored in the ROM while using the RAM as a work memory.

According to the present embodiment, a notification limiting flag or the like is set in the RAM of the control unit 117. The notification limiting flag is a 1-bit flag indicating whether or not the mobile communication terminal 1 is set to a notification limiting mode in which notification to the user that an e-mail is received is limited. In a case where the mobile communication terminal 1 is set to the notification limiting mode, the value of the notification limiting flag is updated to "1". In a case where the notification limiting mode is canceled, the value of the notification limiting flag is updated to "0". In a case where the user desires to be notified only when a highly important e-mail is received, he/she operates the operation section 22 to set the mobile communication terminal 1 to the notification limiting mode.

The memory unit 118 is constituted by, for example, a flash memory or the like, and stores various information, programs, etc. Specifically, the memory unit 118 stores information such as the name, the e-mail address, etc. of the user, as the owner of the mobile communication terminal 1. The memory unit 118 may be provided in the same flash memory as that that constitutes the incoming e-mail storage unit 111, the outgoing e-mail storage unit 112, and the reception notification condition storage unit 115.

The specific operations of the mobile communication terminal 1 having the above-described configuration will be explained.

Figure 7:
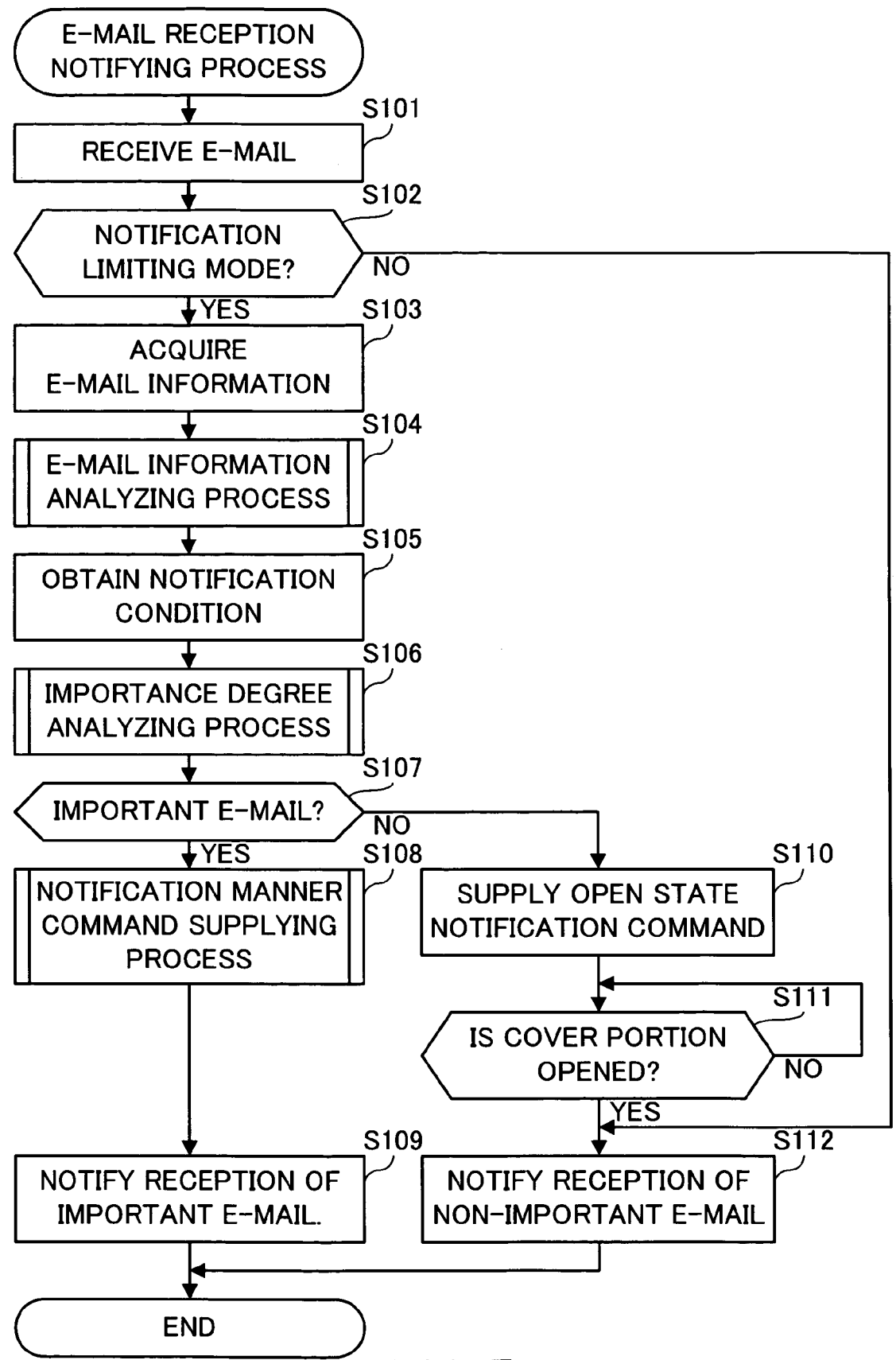
FIG. 7 is a flowchart showing the detail of an e-mail reception notifying process of he mobile communication terminal according to the first embodiment of the present invention.

First, an e-mail reception notifying process of the mobile communication terminal 1 will be explained. FIG. 7 is a flowchart showing the detail of the e-mail reception notifying process of the mobile communication terminal 1 according to the first embodiment of the present invention.

First, as shown in FIG. 7, the control unit 117 receives an e-mail sent from a base station by the communication unit 101 (step S101). The received e-mail (incoming e-mail) is supplied to the e-mail managing unit 116, and stored in the incoming e-mail storage unit 111 by the e-mail managing unit 116 in the data structure shown in FIG. 3.

Next, the control unit 117 checks the value of the notification limiting flag set in the RAM thereinside, to determine whether or not the mobile communication terminal 1 is set to the notification limiting mode (step S102).

In a case where the value of the notification limiting flag is "0", the control unit 117 determines that the mobile communication terminal 1 is not set to the notification limiting mode (step S102; No), and goes to step S112 to be described later to notify the reception of the e-mail in a predetermined notification manner.

To the contrary, in a case where the value of the notification limiting flag is "1", the control unit 117 determines that the mobile communication terminal 1 is set to the notification limiting mode (step S102; Yes), generates an importance degree analyzing command for commanding the analysis of the degree of importance (or degree of urgency) of the incoming e-mail, and supplies the command to the e-mail managing unit 116.

When supplied with the importance degree analyzing command from the control unit 117, the e-mail managing unit 116 causes the e-mail information acquiring unit 113 to acquire information (e-mail information) regarding the e-mail received at step S101 (step S103). Specifically, the e-mail information acquiring unit 113 reads out and acquires various kinds of information (e-mail information) such as the destination address, CC, subject, e-mail body, etc. which are included in the incoming e-mail from the incoming e-mail storage unit 111 in which the incoming e-mail is stored.

Then, the e-mail managing unit 116 causes the e-mail information analyzing unit 114 to analyze the e-mail information acquired by the e-mail information acquiring unit 113 (step S104).

Figure 8:
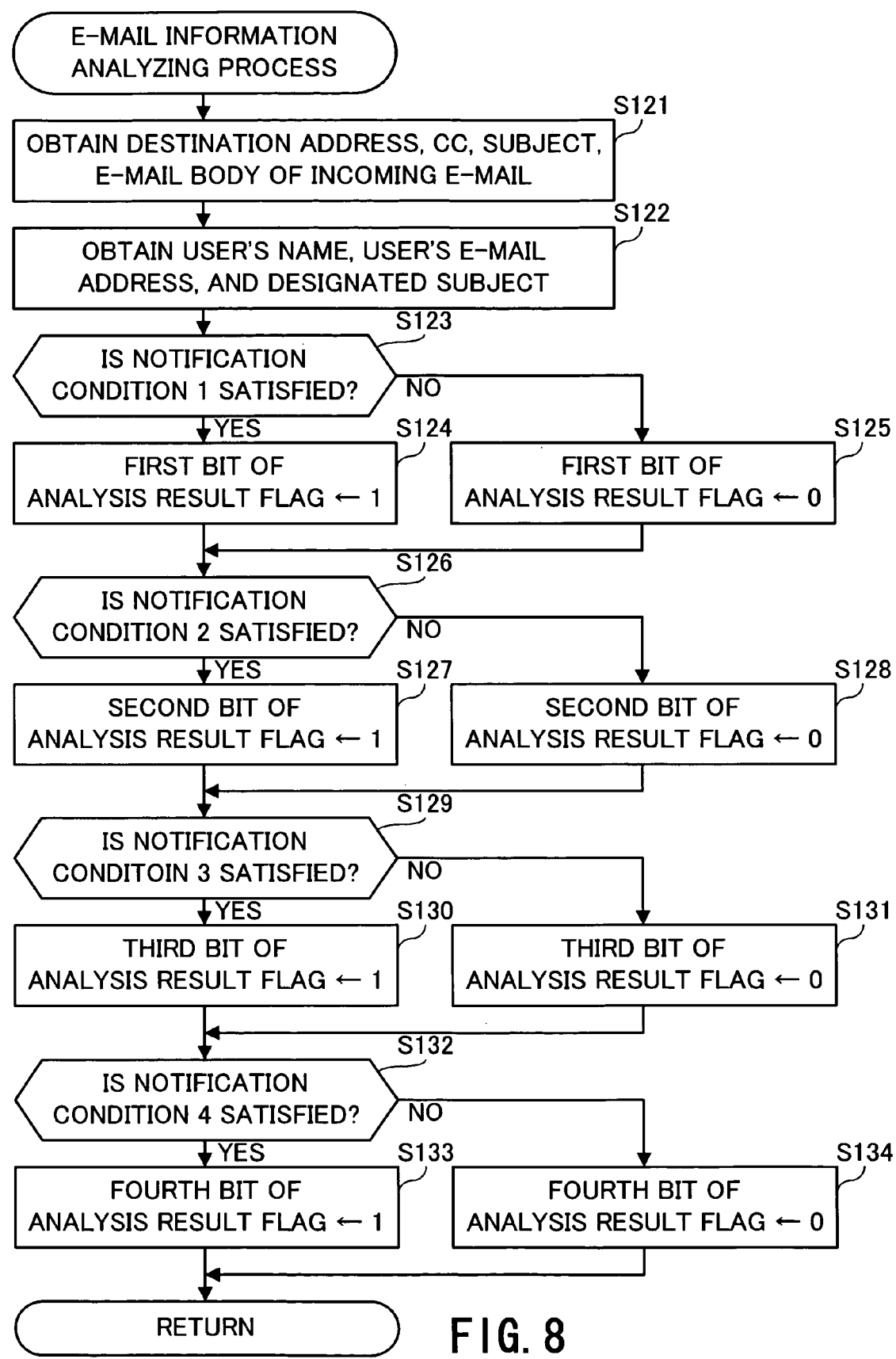
FIG. 8 is a flowchart showing the detail of an e-mail information analyzing process.

FIG. 8 is a flowchart showing the detail of an e-mail information analyzing process at step S104. In this e-mail information analyzing process, the e-mail information analyzing unit 114 analyzes various kinds of information such as the destination address, CC, subject, e-mail body of the incoming e-mail and obtains an analysis result.

In accordance with the analysis result, the value of the analysis result flag set in the RAM of the e-mail managing unit 116 is changed. The analysis result flag is a 4-bit flag likewise the notification condition flag shown in FIG. 5, and the first to fourth bits are associated with the notification conditions 1 to 4 respectively. Based on the value of this analysis result flag, it is specified which of the four notification conditions selectable by the user is satisfied by the incoming e-mail.

In the e-mail information analyzing process, first, the e-mail information analyzing unit 114 obtains information such as the destination address, CC, subject, and e-mail body of the incoming e-mail from the e-mail information acquiring unit 113 via the e-mail managing unit 116 (step S121).

Next, the e-mail information analyzing unit 114 obtains information representing the name and e-mail address of the user from the memory unit 118 via the e-mail managing unit 116 and the control unit 117. Further, the e-mail information analyzing unit 114 obtains information representing the designated subject from the reception notification condition storage unit 115 via the e-mail managing unit 116 (step S122).

Next, the e-mail information analyzing unit 114 determines whether or not the incoming e-mail satisfies the notification condition 1 (step S123). Specifically, the e-mail information analyzing unit 114 determines whether or not the e-mail address of the user is included as the destination address of the incoming e-mail, based on the information obtained at step S121 and step S122. In a case where the e-mail address of the user is included as the destination address of the incoming e-mail (step S123; Yes), the e-mail information analyzing unit 114 sets the first bit of the analysis result flag to "1" (step S124). On the other hand, in a case where the e-mail address of the user is not included as the destination address of the incoming e-mail (step S123; No), the e-mail information analyzing unit 114 sets the first bit of the analysis result flag to "0" (step S125).

Next, the e-mail information analyzing unit 114 determines whether or not the incoming e-mail satisfies the notification condition 2 (step S126). Specifically, the e-mail information analyzing unit 114 determines whether or not the e-mail address of the user is included as CC of the incoming e-mail, based on the information obtained at step S121 and step S122. In a case where the e-mail address of the user is included as CC of the incoming e-mail (step S126; Yes), the e-mail information analyzing unit 114 sets the second bit of the analysis result flag to "1" (step S127). On the other hand, in a case where the e-mail address of the user is not included as CC of the incoming e-mail (step S126; No), the e-mail information analyzing unit 114 sets the second bit of the analysis result flag to "0" (step S128).

Next, the e-mail information analyzing unit 114 determines whether or not the incoming e-mail satisfies the notification condition 3 (step S129). Specifically, the e-mail information analyzing unit 114 determines whether or not the designated subject set by the user is included in the subject of the incoming e-mail, based on the information obtained at step S121 and step S122. In a case where the designated subject is included in the subject of the incoming e-mail (step S129; Yes), the e-mail information analyzing unit 114 sets the third bit of the analysis result flag to "1" (step S130). On the other hand, in a case where the designated subject is not included in the subject of the incoming e-mail (step s129; No), the e-mail information analyzing unit 114 sets the third bit of the analysis result flag to "0" (step S131).

Next, the e-mail information analyzing unit 114 determines whether or not the incoming e-mail satisfies the notification condition 4 (step S132). Specifically, the e-mail information analyzing unit 114 determines whether or not the user's name is included in the first line of the e-mail body of the incoming e-mail, based on the information obtained at step S121 and step S122. In a case where the user's name is included in the first line of the e-mail body of the incoming e-mail (step S132; Yes), the e-mail information analyzing unit 114 sets the fourth bit of the analysis result flag to "1" (step S133), and terminates the e-mail information analyzing process. On the other hand, in a case where the user's name is not included in the first line of the e-mail body of the incoming e-mail (step S132; No), the e-mail information analyzing unit 114 sets the fourth bit of the analysis result flag to "0" (step S134), and terminates the e-mail information analyzing process.

Here, this e-mail information analyzing process will now be explained in an example case where an incoming e-mail is distributed through mailing list (ML), a designated subject is included in the subject of this incoming e-mail, and the first line of the e-mail body reads "Dear Mr./Ms. XX (user's name)". In case of an incoming e-mail through mailing list, the e-mail address of the user is included in the envelope of the incoming e-mail, and not included in either the destination address or CC. Therefore, in this example, the values of the first bit and second bit of the analysis result flag set in the RAM of the e-mail managing unit 116, that correspond to the notification condition 1 and notification condition 2 are both set to "0". Further, in this example, since the designated subject is included in the subject, the value of the third bit of the analysis result flag corresponding to the notification condition 3 is set to "1". Furthermore, in this example, since the user's name is included in the first line of the e-mail body, the value of the fourth bit of the analysis result flag corresponding to the notification condition 4 is set to "1". Consequently, the value of the analysis result flag is "1100" (BIN).

When the value of the analysis result flag is set through the above-described e-mail information analyzing process, the e-mail managing unit 116 reads out the value of the notification condition flag from the reception notification condition storage unit 115 to obtain the notification condition (step S105 of FIG. 7). Based on the value of the notification condition flag, one or a plurality of notification condition(s) selected by the user is/are specified. For example, in a case where the value of the notification condition flag stored in the reception notification condition storage unit 115 is "1101" (BIN), the notification condition 1 "1. the user is included as the destination", the notification condition 3 "3. the designated subject is included in the subject", and the notification condition 4 "4. the user's name is included in the first line of the e-mail body" are specified as the notification conditions.

Then, the e-mail managing unit 116 analyzes the degree of importance of the incoming e-mail based on the result of analyzing the e-mail information and the notification conditions selected by the user (step S106). Specifically, the e-mail managing unit 116 determines whether or not the analysis result achieved in the process of step S104 includes any matches with the notification conditions specified in the process of step S105. In other words, the e-mail managing unit 116 determines whether or not the pieces of information constituting the analysis result include any pieces of information that satisfy the notification conditions.

Figure 9:
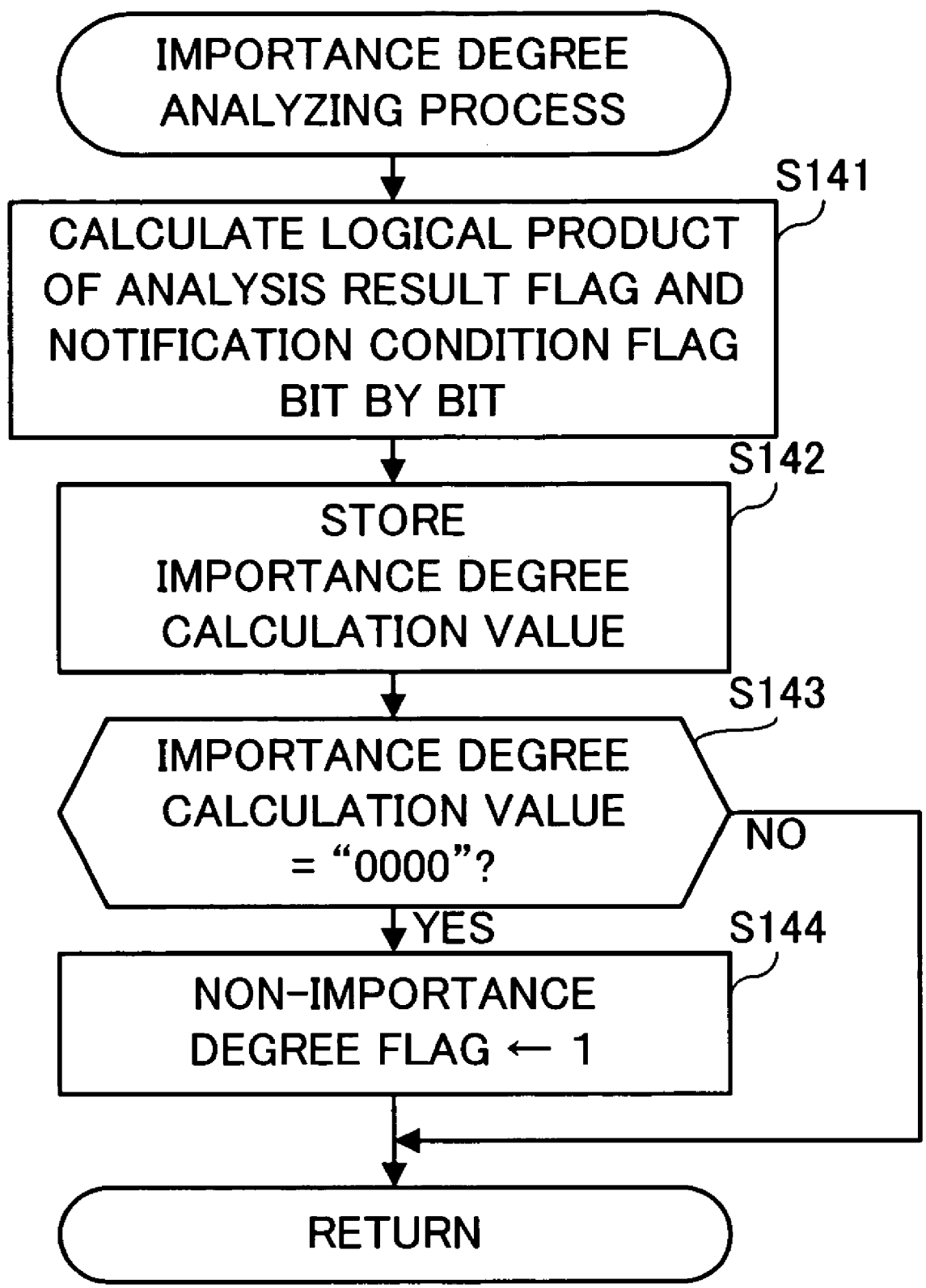
FIG. 9 is a flowchart showing the detail of an importance degree analyzing process.

FIG. 9 is a flowchart showing the detail of the importance degree analyzing process at step S106. In this importance degree analyzing process, the degree of importance of an incoming e-mail is analyzed by determining whether or not the incoming e-mail satisfies the notification conditions selected by the user. Specifically, the analysis result flag and the notification condition flag are compared, and whether the incoming e-mail satisfies the notification conditions is determined depending on whether there is any bit whose value is set to "1" in both of the flags.

In the importance degree analyzing process, first, the e-mail managing unit 116 calculates the logical product of the analysis result flag and the notification condition flag bit by bit (step S141). Specifically, the e-mail managing unit 116 calculates the logical products of the first bits, second bits, third bits, and fourth bits of the analysis result flag and notification condition flag.

The e-mail managing unit 116 stores the calculation results in the RAM or the like as an importance degree calculation value (step S142). Through the calculation of the logical products, only those bits that are set to "1" in both the analysis result flag and the notification condition flag become 1. Thus, based on the importance degree calculation value, notification conditions that are selected by the user and also satisfied by the incoming e-mail are specified.

Next, the e-mail managing unit 116 determines whether or not the importance degree calculation value is "0000" (BIN) (step S143).

In a case where the importance degree calculation value is "0000" (step S143; Yes), the e-mail managing unit 116 determines that the degree of importance of the incoming e-mail is low, because the incoming e-mail satisfies none of the notification conditions designated by the user. Then, the e-mail managing unit 116 updates the value of the non-importance degree flag stored in the incoming e-mail storage unit 111 in association with the incoming e-mail to "1" (step S144), and terminates the importance degree analyzing process.

On the other hand, in a case where the importance degree calculation value is not "0000" (step S143; No), the e-mail managing unit 116 determines that the degree of importance of the incoming e-mail is high, because the incoming e-mail satisfies at least one of the notification conditions designated by the user. Then, the e-mail managing unit 116 skips step S144 so as not to update the value of the non-importance degree flag stored in the incoming e-mail storage unit 111 to leave it at the initial value "0", and terminates the importance degree analyzing process.

In the above-described example, since the value of the analysis result flag is "1100" while the value of the notification condition flag is "1101" and the value of the third bit and the value of the fourth bit in both the flags are both "1", the importance degree calculation value is "1100". Accordingly, the incoming e-mail is determined as an important e-mail that satisfies one or more notification conditions, and the value of the non-importance degree flag is set to "0".

Next, the e-mail managing unit 116 reads out the value of the non-importance degree flag set through the importance degree analyzing process from the incoming e-mail storage unit 111, and determines whether or not the incoming e-mail is an important e-mail based on the value read out (step S107 of FIG. 7).

In a case where the degree of importance is analyzed as high in the process of step S106 and the value of the non-importance degree flag is set to "0", the e-mail managing unit 116 determines that the incoming e-mail is an important e-mail having a high degree of importance (step S107; Yes). In this case, in the subsequent process, the user will be notified of the reception of the e-mail, regardless of whether the cover portion 3 of the mobile communication terminal 1 is opened or closed.

On the other hand, in a case where the degree of importance is analyzed as low in the process of step S106 and the value of the non-importance degree flag is set to "1", the e-mail managing unit 116 determines that the incoming e-mail is a non-important e-mail having a low degree of importance (step S107; No). In this case, in the subsequent process, the notification of the e-mail reception to the user will be limited until the cover portion 3 of the mobile communication terminal 1 is opened, i.e., until there appears a state in which the user can check (view) the content of the e-mail.

For example, in a case where the incoming e-mail is not directly sent to the user but sent to the mailing list in which the e-mail address of the user is registered while the notification condition 1 is only selected as the notification condition, the incoming e-mail is determined as a non-important e-mail. Therefore, until the cover portion 3 of the mobile communication terminal 1 is opened, i.e., until there appears a state in which the user can check the content of the e-mail, the notification of the reception of the e-mail to the user will be limited. However, for example, in a case where the notification condition 3 and the notification condition 4 are also selected in addition to the notification condition 1 while the subject of the incoming e-mail includes a character string representing the subject (designated subject) designated by the user or the character string in the first line of the e-mail body reads "Dear Mr./Ms. XX (user's name)", the incoming e-mail is determined as an important e-mail even if it is sent through mailing list. Therefore, the reception of the e-mail is notified to the user irrespective of whether the cover portion 3 of the mobile communication terminal 1 is opened or closed.

In a case where the incoming e-mail is determined as an important e-mail at step S107 (step S107; Yes), the e-mail managing unit 116 generates a notification manner command for instructing the notification manner corresponding to the notification condition satisfied by the important e-mail, and supplies the command to the control unit 117 (step S108). Specifically, the e-mail managing unit 116 obtains the notification manner that corresponds to the notification condition which matches with a piece of information constituting the analysis result of step S104 from the notification manner determination table shown in FIG. 6, generates a notification manner command for instructing this notification manner, and supplies the command to the control unit 117.

Figure 10:
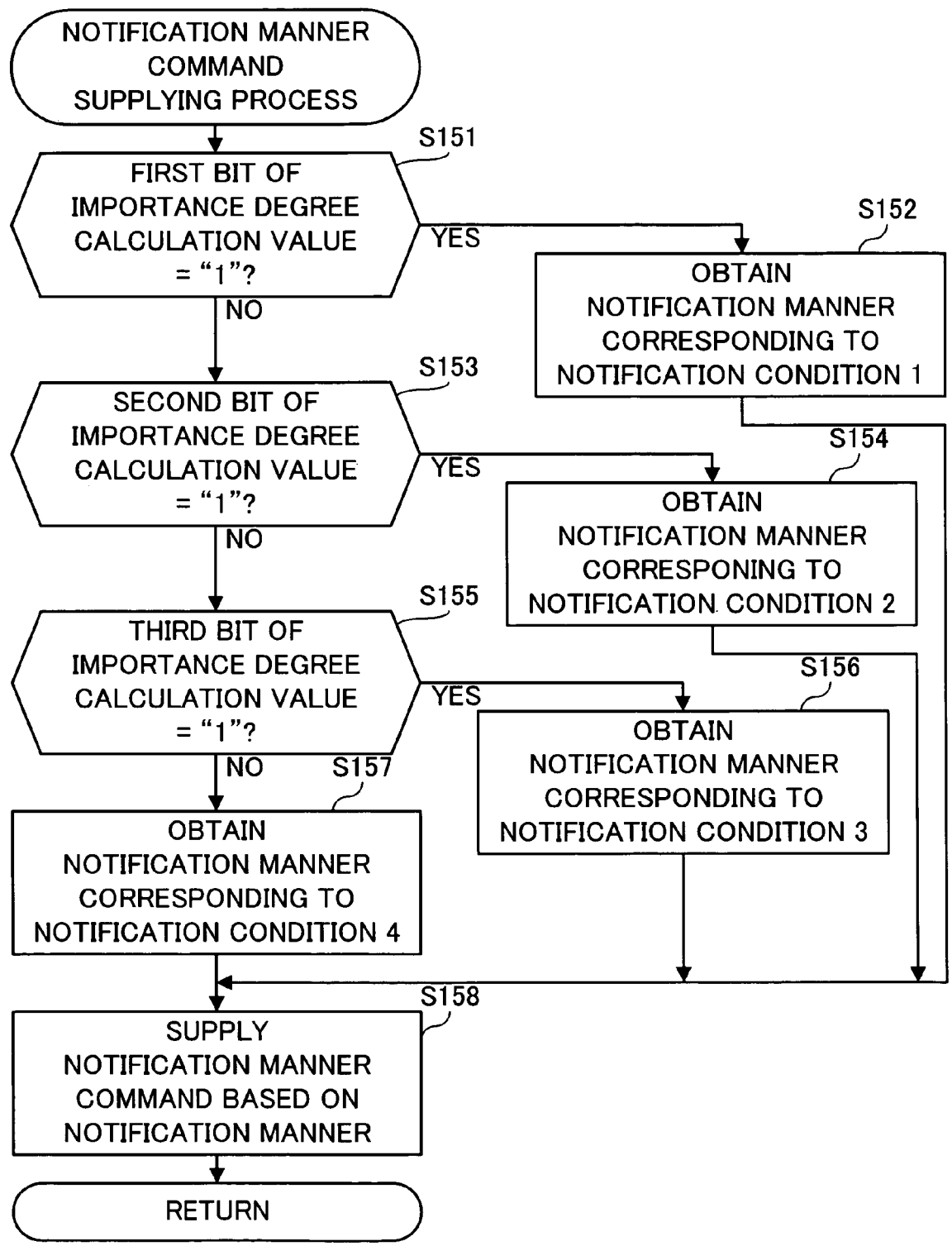
FIG. 10 is a flowchart showing the detail of a notification manner command supplying process.

FIG. 10 is a flowchart showing the detail of the notification manner command supplying process at step S108. In the notification manner command supplying process, the importance degree calculation value stored in the RAM or the like at step S142 of the importance degree analyzing process (FIG. 9) is used.

In the notification manner command supplying process, first, the e-mail managing unit 116 determines whether or not the value of the first bit of the importance degree calculation value is "1", i.e., whether or not the notification condition selected by the user and satisfied by the incoming e-mail is the notification condition 1 (step S151).

In a case where the value of the first bit of the importance degree calculation value is "1" (step S151; Yes), the e-mail managing unit 116 reads out and obtains the notification manner corresponding to the notification condition 1 from the notification manner determination table stored in the reception notification condition storage unit 115 (step S152). Specifically, the e-mail managing unit 116 obtains the information associated with the notification condition 1 regarding whether or not to display the number of newly received e-mails, whether or not to vibrate the mobile communication terminal 1 using the vibrator function and how to vibrate, and whether or not to display the pictogram of the e-mail, from the notification manner determination table shown in FIG. 6.

In a case where the value of the first bit of the importance degree calculation value is not "1" (step S151; No), the e-mail managing unit 116 determines whether or not the value of the second bit of the importance degree calculation value is "1", i.e., whether or not the notification condition selected by the user and satisfied by the incoming e-mail is he notification condition 2 (step S153).

In a case where the value of the second bit of the importance degree calculation value is "1" (step S153; Yes), the e-mail managing unit 116 reads out and obtains the notification manner corresponding to the notification condition 2 from the notification manner determination table (step S154).

In a case where the value of the second bit of the importance degree calculation value is not "1" (step S153; No), the e-mail managing unit 116 determines whether or not the value of the third bit of the importance degree calculation value is "1", i.e., whether or not the notification condition selected by the user and satisfied by the incoming e-mail is the notification condition 3 (step S155).

In a case where the value of the third bit of the importance degree calculation value is "1" (step S155; Yes), the e-mail managing unit 116 reads out and obtains the notification manner corresponding to the notification condition 3 from the notification manner determination table (step S156).

In a case where the value of the third bit of the importance degree calculation value is not "1" (step S155; No), the e-mail managing unit 116 reads out and obtains the notification manner corresponding to the notification condition 4 from the notification manner determination table (step S157). In a case where the importance degree calculation value is not "0000", the non-importance degree flag is set to "0" and the incoming e-mail is determined as an important e-mail (step S107 of FIG. 7; Yes), and the notification manner command supplying process (step S108) is performed. Thus, in the case where the values of the first to third bits of the importance degree calculation value are not "1" (step S155; No), the value of the fourth bit of the importance degree calculation value is determined to be "1" and the notification manner corresponding to the notification condition 4 is obtained (step S157).

When the notification manner is obtained at step S152, at step S154, at step S156, or at step S157, the e-mail managing unit 116 generates a notification manner command based on the obtained notification manner, supplies it to the control unit 117 (step S158), and terminates the notification manner command supplying process. Specifically, when the notification manner corresponding to the notification condition satisfied by the important e-mail is obtained, the e-mail managing unit 116 generates a notification manner command for instructing the obtained notification manner, and supplies the command to the control unit 117.

The control unit 117 notifies the user that an important e-mail the user must read without fail is received, in the notification manner instructed by the notification manner command supplied from the e-mail managing unit 116 (step S109 of FIG. 7).

Specifically, in a case where supplied with a notification manner command for instructing the notification manner corresponding to the notification condition 1, the control unit 117 displays the number of newly received e-mails and the pictogram of the e-mail on the display section 31 as shown in FIG.

11, and rotates the rotation shaft of the vibration motor 108 at a low speed to vibrate the mobile communication terminal 1 at long intervals. As a result, the user is notified that an important e-mail is received, in the notification manner 1. In a case where supplied with a notification manner command for instructing the notification manner corresponding to the notification condition 2, the control unit 117 displays the number of newly received e-mails and the pictogram of the e-mail on the display section 31 as shown in FIG. 11, and rotates the rotation shaft of the vibration motor 108 at a high speed to vibrate the mobile communication terminal 1 at short intervals. Thus, the user is notified that an important e-mail is received, in the notification manner 2. In a case where supplied with a notification manner command for instructing the notification manner corresponding to the notification condition 3 or the notification condition 4, the user is notified that an important e-mail is received, only by the control unit 117 displaying the number of newly received e-mail on the display section 31.

In case of the closed state where the mobile communication terminal 1 is folded, the control unit 117 displays the number of newly received e-mails and the pictogram of the e-mail on the sub display section 33.

In the above-described notification manner command supplying process, in a case where a plurality of notification conditions are satisfied by an important e-mail, the notification manner that corresponds to a notification condition having a higher order than others among the plurality of notification conditions is obtained from the notification manner determination table. In the above-described example where the importance degree calculation value is "1100", the important e-mail satisfies the notification condition 3 and the notification condition 4, and the notification condition corresponding to the notification condition 3, which is higher in the order, is therefore obtained from the notification manner determination table. Contrary to the present embodiment, the notification manner corresponding to the notification condition lower in the order (the notification condition 4 in the above-described example) may be obtained from the notification manner determination table. Alternatively, by using a random number extracted from a predetermined random counter, any one of the plurality of notification conditions satisfied by the important e-mail may be selected, and the notification manner corresponding to the selected notification condition may be obtained from the notification manner determination table.

In a case where it is determined at step S107 of FIG. 7 that the incoming e-mail is a non-important e-mail (step S107; No), the e-mail managing unit 116 generates an open state notification command for instructing that the reception of the non-important e-mail should be notified when the cover portion 3 is opened, and supplies the command to the control unit 117 (step S110). When supplied with the open state notification command, the control unit 117 checks the state of a detection signal output from the cover open/closed sensor 109 and input to the control unit 117 to determine whether or not the over portion 3 is opened (step S111).

In a case where the detection signal from the cover open/closed sensor 109 is in the on state, the control unit 117 determines that the cover portion 3 is closed (step S111; No), and waits until the cover portion 3 is opened. Contrary to this, in a case where the detection signal from the cover open/closed sensor 109 is in the off state, the control unit 117 determines that the cover portion 3 is opened (step S111; Yes), and notifies the user hat a non-important e-mail is received, in a manner different from the manner of notifying reception of an important e-mail (step S112). For example, the control unit 117 displays on the display section 31 that a non-important e-mail is received, continuously vibrates the mobile communication terminal 1, and sounds a ring alert, hereby notifying the reception of the non-important e-mail.

The notification of the reception of a non-important e-mail may be given in a notification manner which makes the user the most aware of the reception, among the notification manners stored in the notification manner determination table shown in FIG. 6 (for example, such a notification manner being the notification manner 1).

In a case where it is determined at step S102 that the mobile communication terminal 1 is not set to the notification limiting mode (step S102; No), the reception of an e-mail is notified to the user in the same manner as the manner of notifying reception of a non-important e-mail, uniformly irrespective of whether the cover portion 3 of the mobile communication terminal 1 is opened or closed.

The foregoing process is the e-mail reception notifying process of the mobile communication terminal 1.

Figure 12:
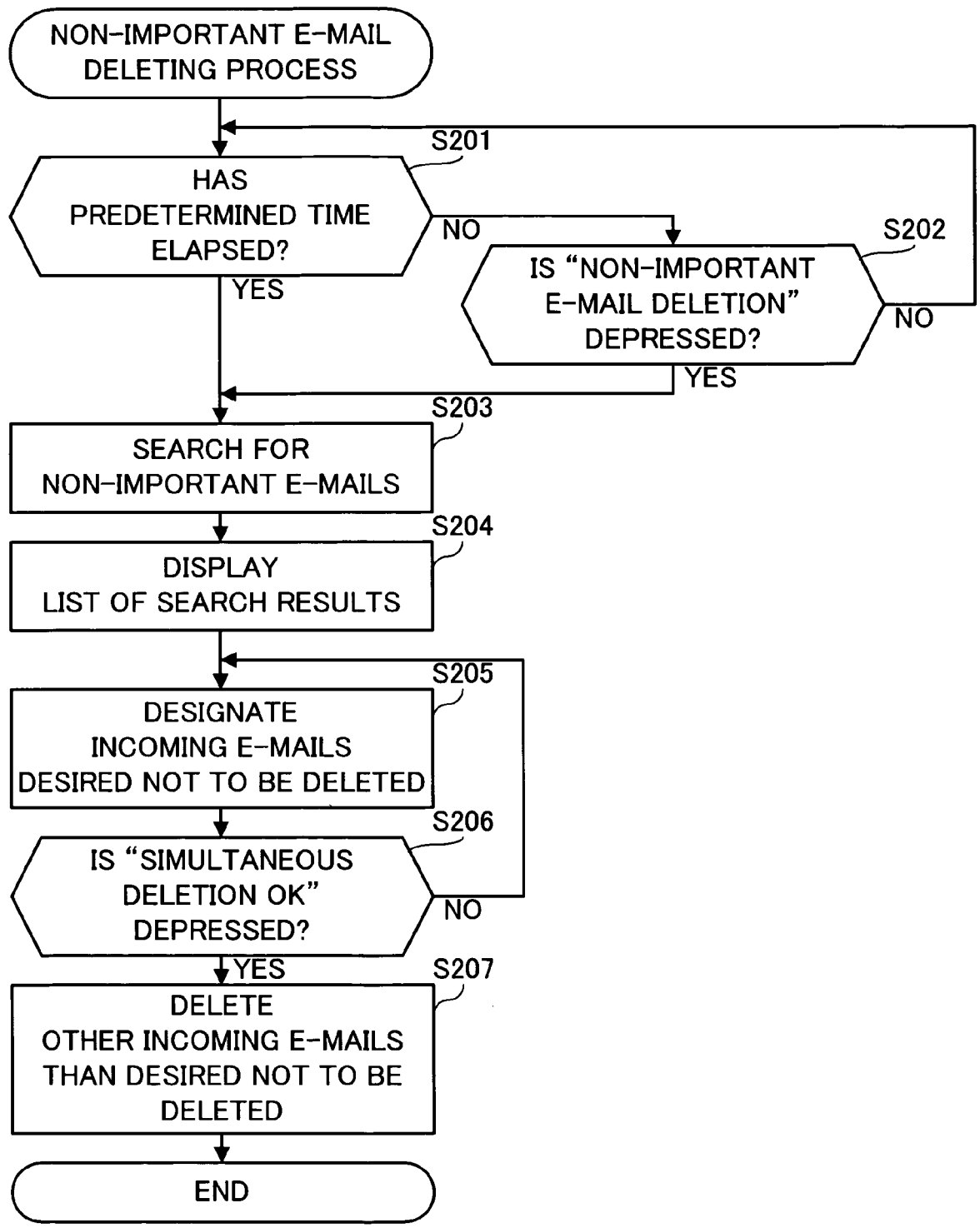
FIG. 12 is a flowchart showing the detail of a non-important e-mail deleting process of the mobile communication terminal according to the first embodiment of the present invention.

Next, a non-important e-mail deleting process of the mobile communication terminal 1 will be explained. FIG. 12 is a flowchart showing the detail of the non-important e-mail deleting process of the mobile communication terminal 1 according to the present embodiment. The non-important e-mail deleting process will be started in response to an instruction of the user from the operation section 22 that a list of the received e-mails should be displayed.

First, the control unit 117 instructs the e-mail managing unit 116 to supply information on all the incoming e-mails stored in the incoming e-mail storage unit 111. In response to this instruction, the e-mail managing unit 116 causes the e-mail information acquiring unit 113 to acquire various kinds of information regarding each incoming e-mail stored in the incoming e-mail storage unit 111, such as the sender (addresser), subject, reception date (or sending date), the value of the non-importance degree flag, etc. The e-mail managing unit 116 supplies the information on each incoming e-mail acquired by the e-mail information acquiring unit 113 to the control unit 117. Then, the control unit 117 displays a list of sender, subject, reception date, etc. of each incoming e-mail supplied from the e-mail managing unit 116 on the display section 31.

Next, as shown in FIG. 12, the control unit 117 determines whether or not a redetermined time has elapsed since the screen (incoming e-mail information list screen) showing the list of information regarding the incoming e-mails was displayed on the display section 31, by, for example, checking the timer value of the built-in timer 110 (step S201). In a case where it is determined in the process of step S201 that the redetermined time has elapsed since the incoming e-mail information list screen was displayed (step S201; Yes) or in a case where a "non-important e-mail deletion" button on the incoming e-mail information list screen is selected and depressed by the user before the predetermined time elapses (step S201; No, step S202; Yes), the control unit 117 searches for the non-important e-mails whose non-importance degree flag has a value "1", from the all the incoming e-mails (step S203).

Then, the control unit 117 displays a list of the search results on the display section 31 (step S204). Specifically, the control unit 117 obtains the sender, subject, reception date, etc. of the non-important e-mails whose non-importance degree flag has a value "1" which are searched out in the process of step S203. As shown in FIG. 13, the control unit 117 displays a list of the obtained information regarding the non-important e-mails on the display section 31, as deletion candidates.

Then, when the user designates any incoming e-mails which the user does not want to be deleted from the screen (deletion candidate list screen) showing the list of the deletion candidate displayed on the display section 31 (step S205), the value of the non-importance degree flag of the designated incoming e-mails is updated to "0" by the control unit 117 and the e-mail managing unit 116. Further, at this time, the checkmarks corresponding to the designated incoming e-mails are canceled on the deletion candidate list screen.

Then, in a case where the user designates all the incoming e-mails which he/she does not want to be deleted and then selects and depresses an "OK (simultaneous deletion OK)" button on the deletion candidate list screen (step S206; Yes), the control unit 117 deletes the other incoming e-mails than those wanted to remain, among the incoming e-mails displayed on the deletion candidate list screen (step S207). Specifically, the control unit 117 deletes the incoming e-mails whose non-importance degree flag has a value "1", from the incoming e-mail storage unit 111.

The above-described process is the non-important e-mail deleting process of the mobile communication terminal 1.

As explained above, the mobile communication terminal 1 according to the present embodiment obtains an analysis result by conducting an analysis of various information such as the destination address, CC, subject, e-mail body, etc. included in an incoming e-mail by the e-mail information analyzing unit 114 (step S104). Then, the mobile communication terminal 1 determines whether or not the incoming e-mail satisfies the notification conditions specified in the process of step S105 based on the analysis result, and analyzes the degree of importance of the incoming e-mail (step S106). Here, if the incoming e-mail is an important e-mail that satisfies the notification conditions (step S107; Yes), the mobile communication terminal 1 notifies the user that an e-mail is received irrespective of whether the cover portion 3 is opened or closed (step S109). In contrast, in a case where the incoming e-mail is a non-important e-mail that does not satisfy the notification conditions (step S107; No), the mobile communication terminal 1 limits the notification of the reception of the e-mail to the user until the cover portion 3 is opened, i.e., until there appears a state in which the user can check the content of the e-mail (step S111; No). Then, when the cover portion 3 is opened, i.e., when there appears a state in which the user can check the content of the e-mail (step S111; Yes), the mobile communication terminal 1 notifies the user that an e-mail is received, in a manner different from that of a case where the incoming e-mail is an important e-mail (step S112).

Accordingly, the mobile communication terminal 1 can limit notifying the reception of an e-mail to the user depending on the degree of importance of the e-mail, while saving the user from missing any e-mail whose degree of importance (or degree of urgency) is high. As a result, it is possible to prevent a situation that the user feels bothered because here are frequent notifications of reception of e-mails.

Further, the manner of notifying the reception of an e-mail to the user in a case where the degree of importance (or degree of urgency) of the incoming e-mail is determined as high is different from that of a case where the degree of importance (or degree of urgency) of the incoming e-mail is determined as low. Therefore, the user can determine whether the incoming e-mail is high or low in the degree of importance, depending on the notification manner, without checking the content of the incoming e-mail storage unit 111.

Further, the mobile communication terminal 1 analyzes the degree of importance by determining whether or not the incoming e-mail satisfies the notification conditions selected by the user (step S106). Then, in a case where it is determined that the degree of importance (or degree of urgency) of the incoming e-mail is high (step S107; Yes), the mobile communication terminal 1 determines which of the plurality of notification conditions is satisfied by the incoming e-mail (steps S151, S153, S155), and notifies the reception of the e-mail to the user in a manner corresponding to the notification condition satisfied by the incoming e-mail based on the determination result (step S109). Therefore, the user can determine what notification condition is satisfied by the incoming e-mail, depending on the notification manner, without checking the content of the incoming e-mail storage unit 111. Specifically, the user can determine whether the incoming e-mail includes the e-mail address of the user as the destination address or CC, whether the incoming e-mail includes the designated subject in the subject, or whether the incoming e-mail includes the user's name in the first line of the e-mail body, depending on the notification manner.

Second Embodiment

In the second embodiment of the present invention, an e-mail reception notifying process in a case where an application program is executed by the mobile communication terminal 1 will be explained.

Figure 14:
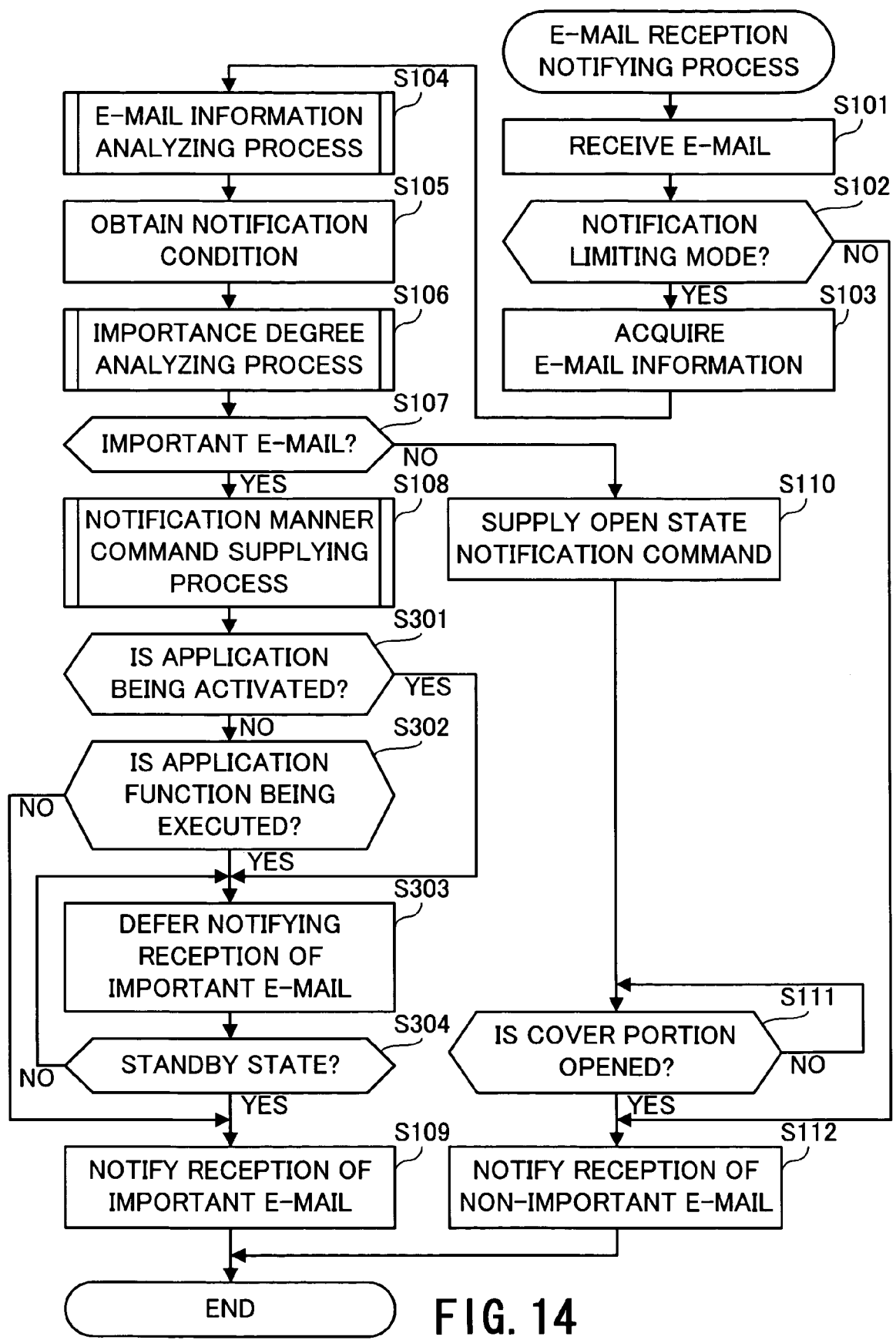
FIG. 14 is a flowchart showing the detail of an e-mail reception notifying process of a mobile communication terminal according to a second embodiment of the present invention.

FIG. 14 is a flowchart showing the detail of the e-mail reception notifying process according to the second embodiment of the present invention. In FIG. 14, the steps at which the same processes as those in the flowchart shown in FIG. 7 are performed will be denoted by the same reference numerals, and explanation of such steps will be omitted.

The e-mail reception notifying process according to the second embodiment of the present invention is different from the e-mail reception notifying process according to the first embodiment of the present invention shown in FIG. 7, in the processes after step S108 at which the notification manner command is supplied to the control unit 117.

In a case where the incoming e-mail is determined as an important e-mail through the processes at steps S101 to S107 of FIG. 14 (step S107; Yes), the e-mail managing unit 116 generates a notification manner command for instructing a notification manner corresponding to the notification condition satisfied by the important e-mail, and supplies the command to the control unit 117 (step S108).

On receiving the notification manner command from the e-mail managing unit 116, the control unit 117 determines whether or not a predetermined application is being activated and whether or not a predetermined function of another application is being executed, by checking an operation mode flag and a function mode flag set in, for example, the RAM (step S301, step S302). In a case where it is determined that the predetermined application is being activated (step S301; Yes), or in a case where it is determined that the predetermined function of another application is being executed (step S301; No, step S302; Yes), the control unit 117 defers notifying the reception of the important e-mail to the user (step S303).

For example, in a case where the mobile communication terminal 1 has a Photo application and a Movie application, the control unit 117 determines at step S301 whether or not, for example, the Photo application is being activated, and determines at step S302 whether or not a recording function or a reproducing function of the Movie application is being executed. In a case where the Photo application is being activated (step S301; Yes), the notification of the reception of the e-mail is deferred (step S303) irrespective of whether a function of the Photo application is being executed or not. In a case where the Movie application is being activated (step S301; No), the notification of the reception of the e-mail is deferred (step S303) only when the recording function or reproducing function of the Movie application is being executed (step S302; Yes). In a case where the other functions of the Movie application are being executed (step S302; No), the notification of the reception of the e-mail is not deferred.

Next, the control unit 117 determines whether or not the mobile communication terminal 1 is in a standby state where the activation of the predetermined application or the execution of the predetermined function of another application is finished (step S304). In a case where the mobile communication terminal 1 is determined not to be in the standby state (step S304; No), the control unit 117 continues deferring the notification of the reception of the e-mail (step S303), and waits until the activation of the predetermined application or the execution of the predetermined function of another application is finished to enter the standby state.

In a case where neither the activation of the predetermined application nor the execution of the predetermined function of another application is done when the notification manner command is supplied and it therefore is determined that the mobile communication terminal 1 is in the standby state (step S301; No, step S302; No), or in a case where the standby state comes after the activation of the predetermined application or the execution of the predetermined function of another application is finished (step S304; Yes), the control unit 117 notifies the user that an important e-mail is received, in the notification manner instructed by the notification manner command supplied from the e-mail managing unit 116 (step S109).

In a case where the incoming e-mail is determined as a non-important e-mail through the processes at steps S101 to S107 of FIG. 14 (step S107; No), the control unit 117 waits until the cover portion 3 of the mobile communication terminal 1 is opened, and notifies the user that a non-important e-mail is received when the cover portion 3 is opened, by the processes at steps S110 to S112.

The above-described process is the e-mail reception notifying process of the mobile communication terminal 1 according to the present embodiment.

As explained above, the mobile communication terminal 1 of the present embodiment defers the notification to the user of the reception of even an important e-mail high in the degree of importance, until it enters the standby state where the activation of the predetermined application or the execution of the predetermined function is finished. Therefore, while a predetermined job is in operation such as during the activation of a predetermined application or during the execution of a predetermined function, notification of the reception of an e-mail is deferred and the user does not feel interfered with due to being notified of the reception of an e-mail during the job. Further, notification of the reception of an e-mail can be limited depending on the degree of importance of the received e-mail.

The present invention is not limited to the above-described first and second embodiments, but can be modified and applied in various manners. Modified versions of the above-described embodiments that are applicable to the present invention will now be explained.

The above-described embodiments have been explained in an example where the present invention is applied to the foldable mobile communication terminal 1. However, the present invention may be applied to a mobile communication terminal 1 of a straight type. In this case, at step S111 of FIG. 7, instead of determining whether or not the cover portion 3 is opened, for example, it may be determined whether the operation section 22 is in an operation-effective state or in an operation-ineffective state due to a key locking function or the like.

The configuration of the e-mail managing unit 116 in the above-described embodiments may be realized by hardware or by software processing by the control unit 117. In this case, a program for controlling the control unit 117 to function as the above-described e-mail managing unit 116 and for realizing the above-described processes may be stored in the inside (for example, in the ROM) of the mobile communication terminal 1, so that the mobile communication terminal 1 may execute the program.

In the above-described embodiments, the program executed by the CPU of the control unit 117 is pre-stored in the ROM or the like. However, the present invention is not limited to this case, but an existing mobile communication terminal or computer may be controlled to function as the mobile communication terminal 1 according to the above-described embodiments, by applying a program for realizing the above-described processes to the existing terminal or computer.

The manner in which such a program is provided is arbitrary. The program may be provided as a data signal embodied in a carrier wave through a communication medium such as the Internet, or may be stored and distributed in a recording medium such as, for example, a memory card.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-299358 filed on Oct. 13, 2005 and including specification, claims, drawings and summary. The disclosure of the above Japanese Patent Application is incorporated herein by reference in its entirety.

What is claimed is:

1. A communication terminal, comprising:
   an e-mail receiving unit which receives an e-mail;
   a first determining unit which determines whether the e-mail received by the e-mail receiving unit is an important e-mail having a high degree of importance;
   a second determining unit which determines whether, based on a predetermined state of the communication terminal, content of the received e-mail is viewable when the first determining unit has determined that the e-mail is not important;
   a third determining unit which determines whether a first application is activated when the first determining unit has determined that the e-mail is important;
   a reception notifying unit which notifies a user that the e-mail is received if one of (i) the first determining unit has determined that the received e-mail is not an important e-mail and the second determining unit has determined that the content of the received e-mail is viewable, and (ii) the first determining unit has determined that the e-mail is an important e-mail and the third determining unit has determined that the first application is not activated; and
   a fourth determining unit which determines whether a predetermined function, which is one of various functions of a second application, is executed when the third determining unit has determined that the first application is not activated, the first application being different from the second application, wherein the reception notifying unit includes:
- a first notification control unit which notifies the user that the e-mail is received if the fourth determining unit has determined that the predetermined function of the second application has not been executed and defers notification to the user that the e-mail is received if the fourth determining unit has determined that the predetermined function of the second application has been executed; and
- a second notification control unit which defers notification to the user that the e-mail is received if the third determining unit has determined that the first application is activated, irrespective of whether a function of the first application has been executed.

2. The communication terminal according to claim 1, further comprising:
an information acquiring unit which acquires plural kinds of information included in the e-mail received by the e-mail receiving unit;

wherein the first determining unit includes:
- an information determining unit which determines whether any type of information is among a plurality of types of information acquired by the information acquiring unit which satisfies a condition set for each of said plural types of information; and
- an e-mail importance degree determining unit which determines that the e-mail received by the e-mail receiving unit is an important e-mail when the information determining unit has determined that the type of information satisfies the set condition for each of said plural types of information, and determines that the received e-mail is not an important e-mail when the information determining unit has determined that there is no type of information that satisfies the set condition for each of said plural types of information.

3. The communication terminal according to claim 2,
wherein the information acquiring unit includes a destination acquiring unit which acquires the destination of the e-mail received by the e-mail receiving unit as one of the plural types of information;

the information determining unit includes a destination determining unit which determines whether an e-mail address of a user is included as the destination of the e-mail acquired by the destination acquiring unit; and the e-mail importance degree determining unit determines that the e-mail received by the e-mail receiving unit is an important e-mail as the condition set for the destination of the e-mail is satisfied when the destination determining unit has determined that the e-mail address of the user is included as the destination of the e-mail.

4. The communication terminal according to claim 2,
wherein the information acquiring unit includes a subject acquiring unit which acquires the subject of the e-mail received by the e-mail receiving unit as one of said plural types of information;

the information determining unit includes a subject determining unit which determines whether a pre-designated subject is included in the subject of the e-mail acquired by the subject acquiring unit; and wherein the e-mail importance degree determining unit determines that the e-mail received by the e-mail receiving unit is an important e-mail as the condition set for the subject of the e-mail is satisfied when the subject determining unit has determined that the pre-designated subject is included in the subject of the e-mail.

5. The communication terminal according to claim 2,
wherein the information acquiring unit includes an e-mail body acquiring unit which acquires the e-mail body of the e-mail received by the e-mail receiving unit as one of said plural types of information;

the information determining unit includes an e-mail body determining unit which determines whether a pre-designated character string is included in the e-mail body of the e-mail acquired by the e-mail body acquiring unit; and wherein the e-mail importance degree determining unit determines that the e-mail received by the e-mail receiving unit is an important e-mail as the condition set for the e-mail body of the e-mail is satisfied when the e-mail body determining unit has determined that the pre-designated character string is included in the e-mail body of the e-mail.

6. The communication terminal according to claim 2,
wherein when the e-mail importance degree determining unit has determined that the e-mail is an important e-mail, the reception notifying unit notifies the user that the e-mail is received, in a manner corresponding to the condition that is satisfied by the important e-mail, among the conditions set for each of said plural types of information.

7. The communication terminal according to claim 1,
wherein the reception notifying unit notifies the user that the e-mail has been received, in different manners in accordance with whether the first determining unit determines one of that the e-mail is an important e-mail and that the e-mail is not an important e-mail.

8. The communication terminal according to claim 1, further comprising:
a fifth determining unit which determines whether the communication terminal is in a standby state;

wherein the reception notifying unit includes a first notification deferring unit which defers notifying a user that the e-mail has been received, until the fifth determining unit has determined that the communication terminal is in a standby state, even when the first determining unit has determined that the e-mail is an important e-mail and the third determining unit has determined that the first application is not activated.

9. The communication terminal according to claim 1,
wherein the second determining unit includes an open/closed state detecting unit which detects whether a combination of a first housing and a second housing is open or closed; and wherein the second determining unit determines whether the content of the e-mail is viewable, in accordance with whether the open/closed state detecting unit detects that the combination is open or detects that the combination is closed.

10. The communication terminal according to claim 1, further comprising:
a mode setting storage unit which stores information indicating whether or not the communication terminal is set to a notification limiting mode in which notification to the user that the e-mail is received is limited; and a mode setting determining unit which determines whether the communication terminal is set to the notification limiting mode, based on the information stored in the mode setting storage unit;

wherein the reception notifying unit includes:
a first reception notifying unit which notifies a user that the e-mail is received, when the mode setting determining unit determines that the communication terminal is set to the notification limiting mode, if one of (i) the first determining unit has determined that the received e-mail is not an important e-mail and the second determining unit has determined that the content of the received e-mail is viewable, and (ii) the first determining unit has determined that the e-mail is an important e-mail and the third determining unit has determined that the first application is not activated; and
a second reception notifying unit which notifies a user that the e-mail is received, when the mode setting determining unit determines that the communication terminal is not set to the notification limiting mode, irrespective of determination results generated by the first determining unit, the second determining unit and the third determining unit.

11. The communication terminal according to claim 1, wherein the reception notifying unit includes a second notification deferring unit which defers notifying the user that the e-mail has been received, when the first determining unit has determined that the received e-mail is not an important e-mail, until the second determining unit has determined that the content of the e-mail is viewable.

12. The communication terminal according to claim 1,
wherein the second application is a movie application,
wherein the predetermined function of the second application is a recording function or a reproducing function of the movie application, and
wherein the first notification control unit notifies the user that the e-mail is received if the fourth determining unit has determined that the recording function or the reproducing function of the movie application is not executed and defers notification to the user that the e-mail is received if the fourth determining unit has determined that the recording function or the reproducing function of the movie application has been executed.

13. The communication terminal according to claim 1,
wherein the first application is a photo application, and
wherein the second notification control unit defers notification to the user that the e-mail is received if the third determining unit has determined that the photo application is activated, irrespective of whether a function of the photo application has been executed.

14. A communication terminal having a first housing and a second housing which are joined by a foldable hinge, the terminal comprising:
an open/closed state detecting unit which detects an open state of the first housing in which the communication terminal is not folded, and a closed state of the first housing in which the communication terminal is folded;
an e-mail receiving unit which receives an e-mail;
a first determining unit which determines whether the e-mail received by the e-mail receiving unit is an important e-mail having a high degree of importance;
a second determining unit which determines whether the open/closed state detecting unit has detected that the first housing is in the open state when the first determining unit has determined that the e-mail is not an important e-mail;
a third determining unit which determines whether a first application is activated when the first determining unit has determined that the e-mail is an important e-mail;
a reception notifying unit which notifies a user that the e-mail has been received if one of (i) the open/closed state detecting unit has detected that the first housing is in the open state and the first determining unit has determined that the e-mail is not an important e-mail, and (ii) the third determining unit has determined that the first application is not activated and the first determining unit has determined that the e-mail is an important e-mail; and
a fourth determining unit which determines whether a predetermined function, which is one of various functions of a second application, is executed when the third determining unit has determined that the first application is not activated, the first application being different from the second application,
wherein the reception notifying unit includes:
a first notification control unit which notifies the user that the e-mail is received if the fourth determining unit has determined that the predetermined function of the second application has not been executed and defers notification to the user that the e-mail is received if the fourth determining unit has determined that the predetermined function of the second application has been executed; and
a second notification control unit which defers notification to the user that the e-mail is received if the third determining unit has determined that the first application is activated, irrespective of whether a function of the first application has been executed.

15. A reception notifying method, comprising:
receiving an e-mail;
determining whether the received e-mail is an important e-mail having a high degree of importance;
determining whether, based on a predetermined condition, content of the e-mail is viewable upon determining that the received e-mail is not an important e-mail;
determining whether a first application is activated upon determining that the received e-mail is an important e-mail;
notifying a user that the e-mail has been received if one of (i) the content of the e-mail is determined to be viewable and the e-mail is not an important e-mail, and (ii) the first application is determined as not activated and the e-mail is an important e-mail;
determining whether a predetermined function, which is one of various functions of a second application, is executed upon determining that the first application is not activated, the first application being different from the second application; and
controlling notification to:
notify the user that the e-mail is received if the predetermined function of the second application is determined as not executed and defer notification to the user that the e-mail is received if the predetermined function of the second application is determined as executed; and
defer notification to the user that the e-mail is received if the first application is determined as activated, irrespective of whether a function of the first application has been executed.

16. A computer-readable recording medium encoded with a computer program executed by a computer that causes notification of receipt of an e-mail, comprising:
program code for receiving an e-mail;
program code for determining whether the received e-mail is an important e-mail having a high degree of importance;

program code for determining, based on a predetermined condition, whether content of the e-mail is viewable upon determining that the received e-mail is not an important e-mail;

program code for determining whether a first application is activated upon determining that the received e-mail is an important e-mail;

program code for notifying a user that the e-mail has been received if one of (i) the content of the e-mail is determined to be viewable and the e-mail is not an important e-mail, and (ii) the first application is determined as not activated and the e-mail is an important e-mail;

program code for determining whether a predetermined function, which is one of various functions of a second application, is executed upon determining that the first application is not activated, the first application being different from the second application; and program code for controlling notification to:
  notify the user that the e-mail is received if the predetermined function of the second application is determined as not executed and defer notification to the user that the e-mail is received if the predetermined function of the second application is determined as executed; and
  defer notification to the user that the e-mail is received if the first application is determined as activated, irrespective of whether a function of the first application has been executed.

17. A communication terminal, comprising:
a receiving unit which receives an e-mail;
an e-mail determining unit which determines whether the e-mail received by the receiving unit is an important e-mail;
an operation unit which receives an input of information from a user;
a state determining unit which determines whether the operation unit is in an effective state in which the user can input the information, when the e-mail determining unit has determined that the e-mail is not an important e-mail;
an application activation determining unit which determines whether a first application is activated, when the e-mail determining unit has determined that the e-mail is an important e-mail;
a notifying unit which notifies the user that the e-mail has been received if one of (i) the state determining unit has determined that the operation unit is in the effective state in which the user can input information and the e-mail determining unit has determined that the e-mail is not an important e-mail, and (ii) the application activation determining unit has determined that the first application is not activated and the e-mail determining unit has determined that the e-mail is an important e-mail; and
a function execution determining unit which determines whether a predetermined function, which is one of various functions of a second application, is executed when the application activation determining unit has determined that the first application is not activated, the first application being different from the second application,
wherein the notifying unit includes:
  a first notification control unit which notifies the user that the e-mail is received if the function execution determining unit has determined that the predetermined function of the second application has not been executed and defers notification to the user that the e-mail is received if the function execution determining unit has determined that the predetermined function of the second application has been executed; and
  a second notification control unit which defers notification to the user that the e-mail is received if the application activation determining unit has determined that the first application is activated, irrespective of whether a function of the first application has been executed.

18. The communication terminal according to claim 17, wherein the notifying unit includes:
a first notifying unit which notifies of reception of the e-mail, when the application activation determining unit determines that the first application is not activated if the e-mail determining unit determines that the e-mail is an important e-mail; and
a second notifying unit which notifies of reception of the e-mail, when the state determining unit determines that the operation unit is in the effective state if the e-mail determining unit determines that the e-mail is not an important e-mail, utilizing a manner of notification that differs from the manner of notification of the first notifying unit.

19. A computer-readable recording medium encoded with a program executed by a computer that causes notification of receipt of an e-mail, comprising:
program code for receiving an e-mail;
program code for determining whether the received e-mail is an important e-mail;
program code for determining whether an operation unit for receiving an input of information from a user is in an effective state in which the user can input the information, when the e-mail is not an important e-mail;
program code for determining whether a first application is activated, when the e-mail is an important e-mail; and
program code for notifying the user that the e-mail has been received if one of (i) the operation unit is determined to be in the effective state in which the user can input the information and the e-mail is not an important e-mail, and (ii) the first application is determined as not activated and the e-mail is an important email;
program code for determining whether a predetermined function, which is one of various functions of a second application, is executed upon determining that the first application is not activated, the first application being different from the second application; and
program code for controlling notification to:
  notify the user that the e-mail is received if the predetermined function of the second application is determined as not executed and defer notification to the user that the e-mail is received if the predetermined function of the second application is determined as executed; and
  defer notification to the user that the e-mail is received if the first application is determined as activated, irrespective of whether a function of the first application has been executed.

* * * * *